(12) United States Patent
Beaumont

(10) Patent No.: US 7,574,466 B2
(45) Date of Patent: *Aug. 11, 2009

(54) METHOD FOR FINDING GLOBAL EXTREMA OF A SET OF SHORTS DISTRIBUTED ACROSS AN ARRAY OF PARALLEL PROCESSING ELEMENTS

(75) Inventor: Mark Beaumont, Reading (GB)

(73) Assignee: Micron Technology, Inc., Boise, ID (US)

( * ) Notice: Subject to any disclaimer, the term of this patent is extended or adjusted under 35 U.S.C. 154(b) by 723 days.

This patent is subject to a terminal disclaimer.

(21) Appl. No.: 10/689,449

(22) Filed: Oct. 20, 2003

(65) Prior Publication Data

US 2004/0215679 A1 Oct. 28, 2004

(30) Foreign Application Priority Data

Apr. 23, 2003 (GB) ................................. 0309205.3

(51) Int. Cl.
*G06F 15/00* (2006.01)
(52) U.S. Cl. ..................................... 708/207
(58) Field of Classification Search ................. 708/207, 708/671

See application file for complete search history.

(56) References Cited

U.S. PATENT DOCUMENTS

| | | | |
|---|---|---|---|
| 4,410,960 A | | 10/1983 | Kasuya |
| 5,122,979 A | * | 6/1992 | Culverhouse ............... 708/207 |
| 5,241,677 A | | 8/1993 | Naganuma et al. |
| 5,262,969 A | | 11/1993 | Ishihara |
| 5,535,387 A | | 7/1996 | Matsuoka et al. |
| 5,581,773 A | | 12/1996 | Glover |

(Continued)

FOREIGN PATENT DOCUMENTS

EP 0404012 A3 12/1990

(Continued)

OTHER PUBLICATIONS

Daehyun Kim, Mainak Chaudhuri, and Mark Heinrich, Leveraging Cache Coherence in Active Memory Systems, Proceedings of the 16th ACM, 2002.

(Continued)

*Primary Examiner*—Chuong D Ngo
(74) *Attorney, Agent, or Firm*—Jones Day; Edward L. Pencoske

(57) ABSTRACT

A method for finding an extrema for an n-dimensional array having a plurality of processing elements, the method includes determining within each processing element a first dimensional extrema for a first dimension, wherein the first dimensional extrema is related to the local extrema of the processing elements in the first dimension and wherein the first dimensional extrema has a most significant byte and a least significant byte, determining within each processing element a next dimensional extrema for a next dimension of the n-dimensional array, wherein the next dimensional extrema is related to the first dimensional extrema and wherein the next dimensional extrema has a most significant byte and a least significant byte; and repeating the determining within each processing element a next dimensional extrema for each of the n-dimensions, wherein each of the next dimensional extrema is related to a dimensional extrema from a previously selected dimension.

24 Claims, 14 Drawing Sheets

U.S. PATENT DOCUMENTS

| | | | |
|---|---|---|---|
| 5,630,129 | A | 5/1997 | Wheat |
| 5,737,251 | A * | 4/1998 | Kohno et al. ............... 708/207 |
| 5,850,489 | A | 12/1998 | Rich |
| 5,892,517 | A | 4/1999 | Rich |
| 5,966,528 | A | 10/1999 | Wilkinson et al. |
| 5,991,785 | A | 11/1999 | Alidina et al. |
| 6,029,244 | A | 2/2000 | Oberman et al. |
| 6,078,945 | A | 6/2000 | Hinsley |
| 6,219,776 | B1 | 4/2001 | Pechanek et al. |
| 6,279,088 | B1 | 8/2001 | Elliot et al. |
| 6,292,822 | B1 | 9/2001 | Hardwick |
| 6,404,439 | B1 | 6/2002 | Coulombe et al. |
| 6,421,772 | B1 | 7/2002 | Maeda et al. |
| 6,430,618 | B1 | 8/2002 | Karger et al. |
| 6,948,056 | B1 | 9/2005 | Roth et al. |
| 2002/0116425 | A1 | 8/2002 | Imai |

FOREIGN PATENT DOCUMENTS

| | | |
|---|---|---|
| JP | 7-064766 A | 3/1993 |
| SU | 1546960 A | 2/1990 |
| WO | WO 91/19259 A1 | 12/1991 |
| WO | WO 99/19791 | 4/1999 |
| WO | WO 01/67238 A1 | 11/2001 |

OTHER PUBLICATIONS

Mainak Chaudhuri, Daehyun Kim, and Mark Heinrich, Cache Coherence Protocol Design for Active Memory Systems, Proceedings of the 2002.

* cited by examiner

US 7,574,466 B2

METHOD FOR FINDING GLOBAL EXTREMA OF A SET OF SHORTS DISTRIBUTED ACROSS AN ARRAY OF PARALLEL PROCESSING ELEMENTS

CROSS-REFERENCE TO RELATED APPLICATIONS

The present application is related to U.S. patent application Ser. No. 10/689,335 entitled "Method for Finding Local Extrema of a Set of Values for a Parallel Processing Element" filed 20 Oct. 2003 now U.S Pat. No. 7,454,451, and U.S. patent application Ser. No. 10/689,256 entitled "Method for Finding Global Extrema of a Set of Bytes Distributed Across an Array of Parallel Processing Elements" filed 20 Oct. 2003 now U.S. Pat. No. 7,447,720.

BACKGROUND OF THE INVENTION

The present invention relates generally to parallel processing and more particularly to determining an extrema (e.g., maximum or minimum) from a set of values distributed across an array of processing element in a parallel processing system.

Conventional central processing units ("CPU's"), such as those found in most personal computers, execute a single program (or instruction stream) and operate on a single stream of data. For example, the CPU fetches its program and data from a random access memory ("RAM"), manipulates the data in accordance with the program instructions, and writes the results back sequentially. There is a single stream of instructions and a single stream of data (note: a single operation may operate on more than one data item, as in X=Y+Z, however, only a single stream of results is produced). Although the CPU may determine the sequence of instructions executed in the program itself, only one operation can be completed at a time. Because conventional CPUs execute a single program (or instruction stream) and operate on a single stream of data, conventional CPUs may be referred to as a single-instruction, single data CPU or an SISD CPU.

The speed of conventional CPUs has dramatically increased in recent years. Additionally, the use of cache memories enables conventional CPUs faster access to the desired instruction and data streams. However because conventional CPUs can complete only one operation at a time, conventional CPUs are not suitable for extremely demanding applications having large data sets (such as moving image processing, high quality speech recognition, and analytical modeling applications, among others).

Improved performance over conventional SISD CPUs may be achieved by building systems which exhibit parallel processing capability. Typically, parallel processing systems use multiple processing units or processing elements to simultaneously perform one or more tasks on one or more data streams. For example in one class of parallel processing system, the results of an operation from a first CPU are passed to a second CPU for additional processing, and from the second CPU to another CPU, and so on. Such a system, commonly known as a "pipeline", is referred to as a multiple-instruction, single-data or MISD system because each CPU receives a different instruction stream while operating on a single data stream. Improved performance may also be obtained by using a system which contains many autonomous processors, each running its own program (even if the program running on the processors is the same code) and producing multiple data streams. Systems in this class are referred to as a multiple-instruction, multiple-data or MIMD system.

Additionally, improved performance may be obtained using a system which has multiple identical processing units each performing the same operations at once on different data streams. The processing units may be under the control of a single sequencer running a single program. Systems in this class are referred to as a single-instruction, multiple data or SIMD system. When the number of processing units in this type of system is very large (e.g., hundreds or thousands), the system may be referred to as a massively parallel SIMD system.

Nearly all computer systems now exhibit some aspect of one or more of these types of parallelism. For example, MMX extensions are SIMD; multiple processors (graphics processors, etc) are MIMD; pipelining (especially in graphics accelerators) is MISD. Furthermore, techniques such as out of order execution and multiple execution units have been used to introduce parallelism within conventional CPUs as well.

Parallel processing is also used in active memory applications. An active memory refers to a memory device having a processing resource distributed throughout the memory structure. The processing resource is most often partitioned into many similar processing elements (PEs) and is typically a highly parallel computer system. By distributing the processing resource throughout the memory system, an active memory is able to exploit the very high data bandwidths available inside a memory system. Another advantage of active memory is that data can be processed "on-chip" without the need to transmit the data across a system bus to the CPU or other system resource. Thus, the work load of the CPU may be reduced to operating system tasks, such as scheduling processes and allocating system resources.

A typical active memory includes a number of interconnected PEs which are capable of simultaneously executing instructions sent from a central sequencer or control unit. The PEs may be connected in a variety of different arrangements depending on the design requirements for the active memory. For example, PEs may be arranged in hypercubes, butterfly networks, one-dimensional strings/loops, and two-dimensional meshes, among others.

A typical PE may contain data, for example a set of values, stored in one or more registers. In some instances, it may be desirable to determine the extrema (e.g., the highest or lowest value) of the set of values on an individual PE. Furthermore, it may be desirable to find the extrema for an entire array of PEs. Conventional methods for finding the extrema, however, often results in a number processing cycles being "lost." A lost cycle may refer to, for example, a cycle in which the PE must wait to complete a calculation because the necessary data has yet to be transferred into or out of the PE.

One approach for finding the global extrema of a set of shorts (i.e., a "short" refers to a 16-bit value) for an array of 8-bit processors transmits the bytes in the order in which they are needed for comparison in the PE. The 8-bit PE processes each short as two separate bytes, a "most significant" MS byte and a "least significant" (LS) byte. Once started, for continuous operation, this approach requires a further four (4) cycles per short. First, the local LS-byte of the needed short is loaded onto the network during the first clock pulse and transferred to the PE during the second clock pulse. Next, the local MS-byte of the needed short is loaded onto the network during the third clock pulse and transferred to the PE during the fourth clock pulse. As can be seen, four (4) cycles are required to transfer the needed short to the PE. Thus to transfer sixteen (16) shorts, sixty-four (64) cycles are required.

Also, two (2) cycles are required for the PE to compare one short to another short. For example, the LS-byte of short-1 is compared to the LS-byte of short-2 in a first cycle and the MS-byte of short-1 is compared to the MS-byte of short-2 in a second cycle. For sixteen (16) values, fifteen (15) comparisons are required. Thus of the total sixty-four (64) cycles, the PE is "working" a minimum of thirty (30) cycles and is idle for thirty-four (34) cycles. Accordingly, this approach is considered to have a "transfer bottleneck" because the idle cycles are caused by the way the bytes are transferred.

A second approach attempts to minimize the time required to transfer the shorts by first transferring all of the LS-bytes to the PE and then transferring all of the MS bytes to the PE. Once started, for continuous operation, this approach requires approximately 3 cycles per short. For example for sixteen (16) PEs each having one local short, sixteen (16) cycles are needed to transfer each short's LS-byte to each other PE and to collect the sixteen (16) LS bytes in the PE's register files. An additional sixteen (16) cycles are then needed to transfer each short's MS-byte to each other PE and to start comparing the shorts to each other. Another fifteen (15) cycles are needed to finish comparing the shorts. It should be noted that the PE cannot start comparing the shorts until the first MS-byte is transferred. After the first MS-byte is transferred, the PE requires 30 cycles to finish comparing all sixteen (16) shorts. Thus of the forty six total cycles, the transfer network is working for thirty-two (32) cycles and is idle for fourteen (14) cycles. Accordingly, this approach is considered to have a "processing bottleneck" because the idle cycles are caused by the way the bytes are processed. It should be noted that each of the approaches discussed above may also require additional cycles for initialization and termination of the process.

Each of the approaches discussed above have idle or "lost" cycles. Thus, there exists a need for a method for determining the extrema of a set of values on an array of parallel processors such that the resources of the parallel processing system are maximized. More specifically, there exists a need for a method for determining the extrema of a set of values on an array of parallel processing elements of an active memory such that the resources of the active memory are maximized.

SUMMARY OF THE INVENTION

One aspect of the present invention relates to a method for finding an extrema for an n-dimensional array having a plurality of processing elements comprising determining within each of the processing elements a first dimensional extrema for a first dimension of the n-dimensional array, wherein the first dimensional extrema is related to one or more local extrema of the processing elements in the first dimension and wherein the first dimensional extrema has a most significant byte and a least significant byte, determining within each of the processing elements a next dimensional extrema for a next dimension of the n-dimensional array, wherein the next dimensional extrema is related to one or more of the first dimensional extrema and wherein the next dimensional extrema has a most significant byte and a least significant byte, and repeating the determining within each of the processing elements a next dimensional extrema for each of the n-dimensions, wherein each of the next dimensional extrema is related to a dimensional extrema from a previously selected dimension.

Another aspect of the present invention relates to a method for identifying extrema within a data stream as having one of an odd or an even position, the extrema having a most significant byte and a least significant byte, processing the extrema having an odd position to produce an odd extrema, the odd extrema having a most significant byte and a least significant byte, processing the extrema having an even position to produce an even extrema, the even extrema having a most significant byte and a least significant byte, and determining a dimensional extrema from the odd extrema and the even extrema, the dimensional extrema having a most significant byte and a least significant byte.

Another aspect of the present invention relates to a method for determining a dimensional extrema for an n-dimensional array of processing elements. The method comprises loading odd numbered extrema from a set of the processing elements in a first dimension into a first plurality of registers, loading even numbered extrema from a set of processing elements into a second plurality of registers, comparing certain of the loaded odd numbered extrema to produce an odd extrema, the odd extrema having a most significant byte and a least significant byte, comparing certain of the loaded even numbered extrema to produce an even extrema, the even extrema having a most significant byte and a least significant byte, and producing a dimensional extrema in response to the odd extrema and the even extrema, the dimensional extrema having a most significant byte and a least significant byte.

The present invention enables the multi-byte extrema of a set of values distributed across an array of parallel processors to be determined while maximizing the resources of the parallel processing system. More specifically, the least significant bytes and the most significant bytes of data for the set of values are distributed in bursts to reduce the amount of lost cycles, among others. The present invention may be performed using the hardware and software (i.e., the local processing capability) of each PE within the array. Those advantages and benefits, and others, will become apparent from the description of the invention below.

BRIEF DESCRIPTION OF THE DRAWINGS

To enable the present invention to be easily understood and readily practiced, the present invention will now be described for purposes of illustration and not limitation, in connection with the following figures wherein.

DETAILED DESCRIPTION OF THE INVENTION

As discussed above, parallel processing systems may be placed within one or more classifications (e.g., MISD, MIMD, SIMD, etc.). For simplicity, the present invention is discussed in the context of a SIMD parallel processing system. More specifically, the present invention is discussed in the context of a SIMD active memory. It should be noted that such discussion is for clarity only and is not intended to the limit the scope of the present invention in any way. The present invention may be used for other types and classifications of parallel processing systems.

Figure 1:
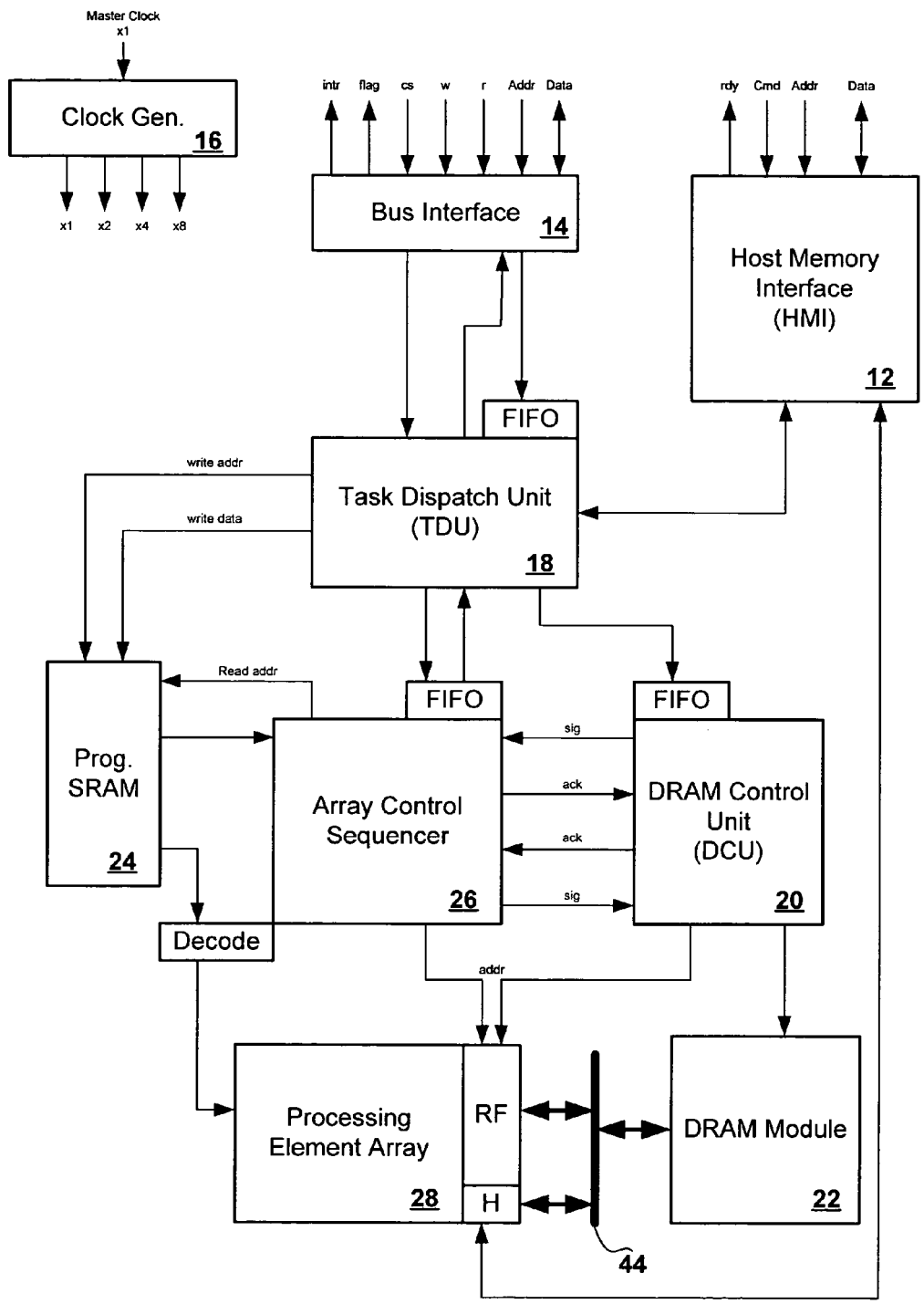
FIG. 1 is a block diagram illustrating an active memory according to an embodiment of the present invention.

FIG. 1 is a block diagram illustrating an active memory 10 according to an embodiment of the present invention. It should be noted that the active memory 10 is only one example of a device on which the methods of the present invention may be practiced and those of ordinary skill in the art will recognize that the block diagram of FIG. 1 is an overview of an active memory device 10 with a number of components known in the art being omitted for purposes of clarity.

Active memory 10 is intended to be one component in a computer system. Processing within active memory 10 is initiated when the active memory 10 receives commands from a host processor (not shown), such as the computer system's CPU. A complete processing operation (i.e., data movement and processing) in the active memory 10 may consist of a sequence of many commands from the host to the active memory device 10.

Active memory 10 is comprised of a host memory interface ("HMI") 12, a bus interface 14, a clock generator 16, a task dispatch unit ("TDU") 18, a DRAM control unit ("DCU") 20, a DRAM module 22, a programmable SRAM 24, an array control sequencer 26, and a processing element array 28, among others.

The HMI 12 provides an input/output channel between the host (such as a CPU, not shown) and the DRAM module 22. In the current embodiment, the HMI 12 receives command (cmd), address (addr), and data signals (among others) from and sends data and ready (rdy) signals (among others) to the host. The HMI 12 approximates the operation of a standard non-active memory so that the host, without modifications, is compatible with the active memory 10.

The HMI 12 may be similar in its operation to the interface of a synchronous DRAM as is know in the art. Accordingly, the host must first activate a page of data to access data within a DRAM module 22. In the current embodiment, each page may contain 1024 bytes of data and there may be 16,384 pages in all. Once a page has been activated, it can be written and read through the HMI 12. The data in the DRAM module 22 may be updated when the page is deactivated. The HMI 12 also sends control signals (among others) to the DCU 20 and to the processing element array 28 via the task dispatch unit 18.

The HMI 12 may operate at a frequency different than that of the frequency of the master clock. For example, a 2× internal clock signal from clock generator 16 may be used. Unlike a traditional DRAM, the access time for the HMI 12 uses a variable number of cycles to complete an internal operation, such as an activate or deactivate. Thus, the ready signal (rdy) is provided to allow the host to detect when a specific command has been completed.

The bus interface 14 provides and input/output channel between the host and the TDU 18. For example, the bus interface 14 receives column select (cs), write command (w), read command (r), address (addr), and data signals (among others) from and places interrupt (intr), flag, and data signals (among others) onto the system bus (not shown). The bus interface 14 also receives signals from and sends signals to TDU 18.

The clock generator 16 is operable to receive an external master clock signal (x1) and operable to provide the master clock signal (x1) and one or more internal clock signals (x2, x4, x8) to the components of the active memory. It should be apparent to one skilled in the art that other internal clock signals may be produced by the clock generator 16.

The TDU 18 communicates with the bus interface 14, the HMI 12, the programmable SRAM 24, the array control sequencer 26, and the DCU 20. In the current embodiment, the TDU 18 functions as an interface to allow the host to issue a sequence of commands to the array control sequencer 26 and the DCU 20. Task commands from the host may be buffered in the TDU's FIFO buffers to allow a burst command to be issued. Commands may contain information on how the tasks in the array control sequencer 26 and the DCU 20 should be synchronized with one another, among others.

The DCU 20 arbitrates between the TDU 18 and the HMI 12 and sends commands to the DRAM modules 22 and the processing element array 28. The DCU 20 also schedules refreshes within the DRAM modules 22. In one embodiment, the DRAM modules 22 of the active memory 10 may be comprised of sixteen 64 k×128 eDRAM (or embedded DRAM) cores. Each eDRAM core may be connected to an array of sixteen PEs, thus requiring 256 (16×16) PEs in all.

The programmable SRAM 24 functions as a program memory by storing commands issued by the TDU 18. For example, the TDU 18 may transmit a "write program memory address" command which sets up a start address for a write operation and a "write program memory data" command which writes a memory location and increments the program memory write address, among others. The programmable SRAM 24, in the current embodiment, has both an address register and a data output register.

The array control sequencer 26 is comprised of a simple 16 bit minimal instruction set computer (16-MISC). The array control sequencer 26 communicates with the TDU 18, the programmable SRAM 24, and the DCU 20, and is operable to generate register file addresses for the processing element array 28 and operable to sequence the array commands, among others.

The processing element array 28 is comprised of a multitude of processing elements ("PEs") 30 (see FIG. 2) connected in a variety of different arrangements depending on the design requirements for the processing system. For example, processing units may be arranged in hypercubes, butterfly networks, one-dimensional strings/loops, and two-dimensional meshes, among others. For discussion of the current embodiment, the PEs 30 are arranged in an 16×16, 2-dimensional loop connected array (see FIG. 7).

The processing element array 28 communicates with the DRAM module 22 and executes commands received from the programmable SRAM 24, the array control sequencer 26, the DCU 20, and the HMI 12. Each PE in the processing element array 28 includes dedicated H-registers for communication with the HMI 12. Control of the H-registers is shared by the HMI 12 and the DCU 20.

Figure 2:
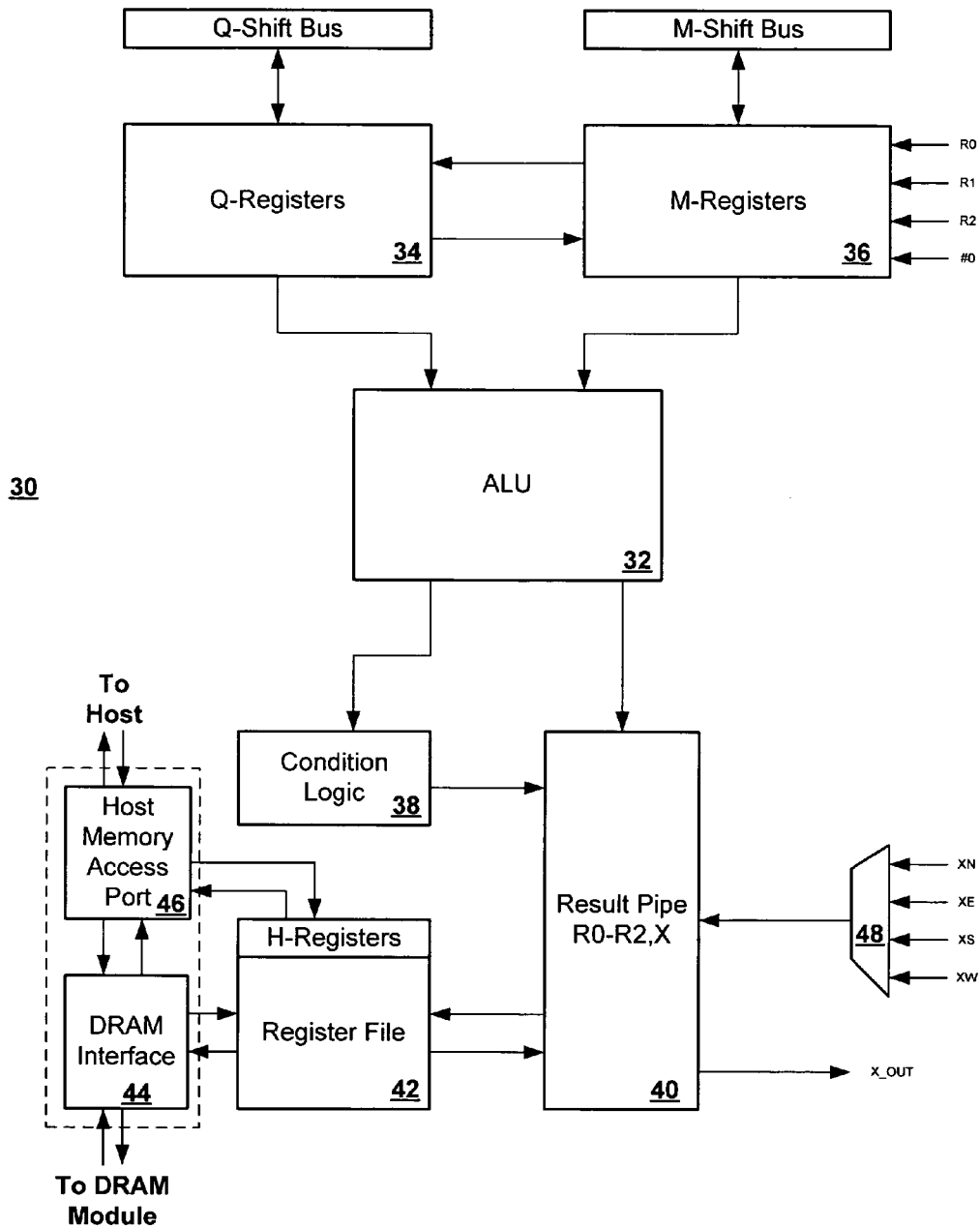
FIG. 2 is a block diagram of a processing element for the active memory illustrated in FIG. 1 according to an embodiment of the present invention.

Referring now to FIG. 2, a block diagram of a PE 30 according to one embodiment of the present invention is illustrated. PE 30 includes an arithmetic logic unit ("ALU") 32, Q-registers 34, M-registers 36, a shift control and condition register 38 (also called "condition logic" 38), a result register pipeline 40, and register file 42. The PE 30 may also contain other components such as multiplexers 48 and logic gates (not shown), among others.

In the current embodiment, the Q-registers 34 are operable to merge data into a floating point format and the M-Registers 36 are operable to de-merge data from a floating point format into a single magnitude plus an exponent format, among others. The Q- and M-registers may receive data from Q and M shift buses, respectively, and from the result register pipeline 40, among others.

The ALU 32 includes a multiplier-adder operable (among others) to receive information from the Q-registers 34 and M-registers 36, execute tasks assigned by the TDU 18 (see FIG. 1), and transmit results to the condition logic 38 and to the result register pipeline 40. The result register pipeline 40 is operable to communicate with the register file 42, which holds data for transfer into or out of the DRAM modules 22 via a DRAM interface 44. Data is transferred between the PE and the DRAM module 22 via a pair a registers, one register being responsive to the DCU 20 and the other register being responsive to the PE 30. The DRAM interface 44 receives command information from the DCU 20. The DRAM interface 44 also permits the PE 30 to communicate with the host through the host memory access port 46.

In the current embodiment, the H-registers 42 are comprised of synchronous SRAM and each processing element within the processing element array 28 contains eight H-registers 42 so that two pages can be stored from different DRAM locations, thus allowing the interleaving of short i/o bursts to be more efficient. Result register pipeline 40 also includes one or more neighborhood connection registers ("X-register") (see FIG. 3). The X-register links one PE 30 via a transfer network to its neighboring PE's 30 in the processing element array 28.

Figure 3:
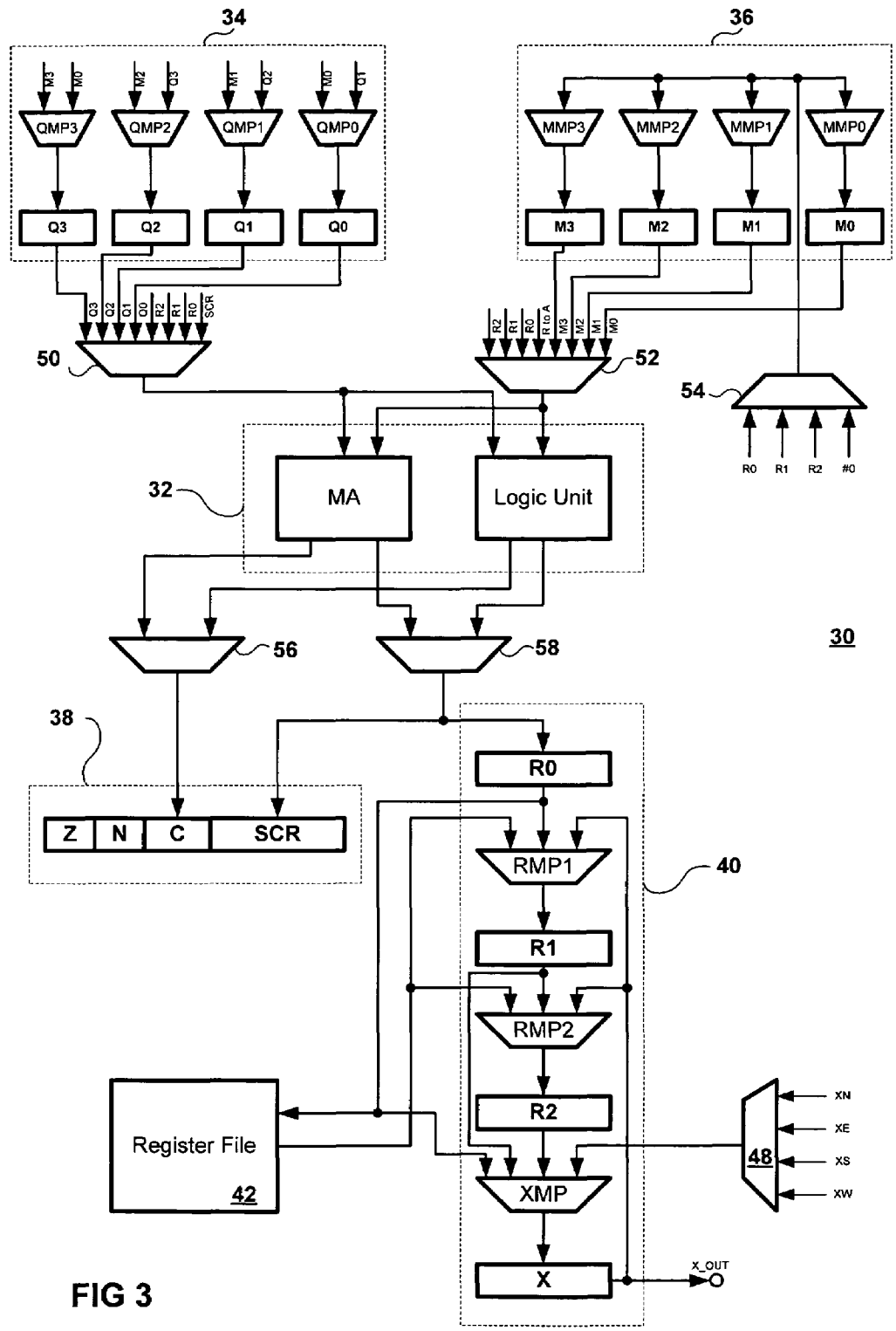
FIG. 3 is a more detailed illustration of the processing elements of FIG. 2 according to an embodiment of the present invention.

FIG. 3 is a more detailed illustration of some components of the processing element of FIG. 2 according to an embodiment of the present invention. For example in FIG. 3, M-registers 36 include of four (4) registers M0-M3 each having an associated multiplexer MMP0-MMP3, respectively, which receive signals from the result pipe 40 (among others) via multiplexer 54. The output of registers M0-M3 are connected to ALU 32 via multiplexer 52. Furthermore, Q-registers 34 include of four (4) registers Q0-Q3 each having an associated multiplexer QMP0-QMP3, respectively, which receive signals from each other and from the output of the M-registers 36 (among others). The output of registers Q0-Q3 are connected to ALU 32 via multiplexer 50.

Additionally, result pipe 40 includes four (4) registers R0, R1, R2, and X, as well as several multiplexers (i.e., RMP1, RMP2, XMP). The output of registers R0, R1, and R2 may be sent, for example, to M-registers 36 via multiplexer 54 and to the ALU 32 via multiplexer 50. Furthermore, the output of the X register may be sent back to registers R1 and R2 in the result pipe 40 and sent to neighboring PEs via a transfer network accessed through node X-OUT.

Figure 7:
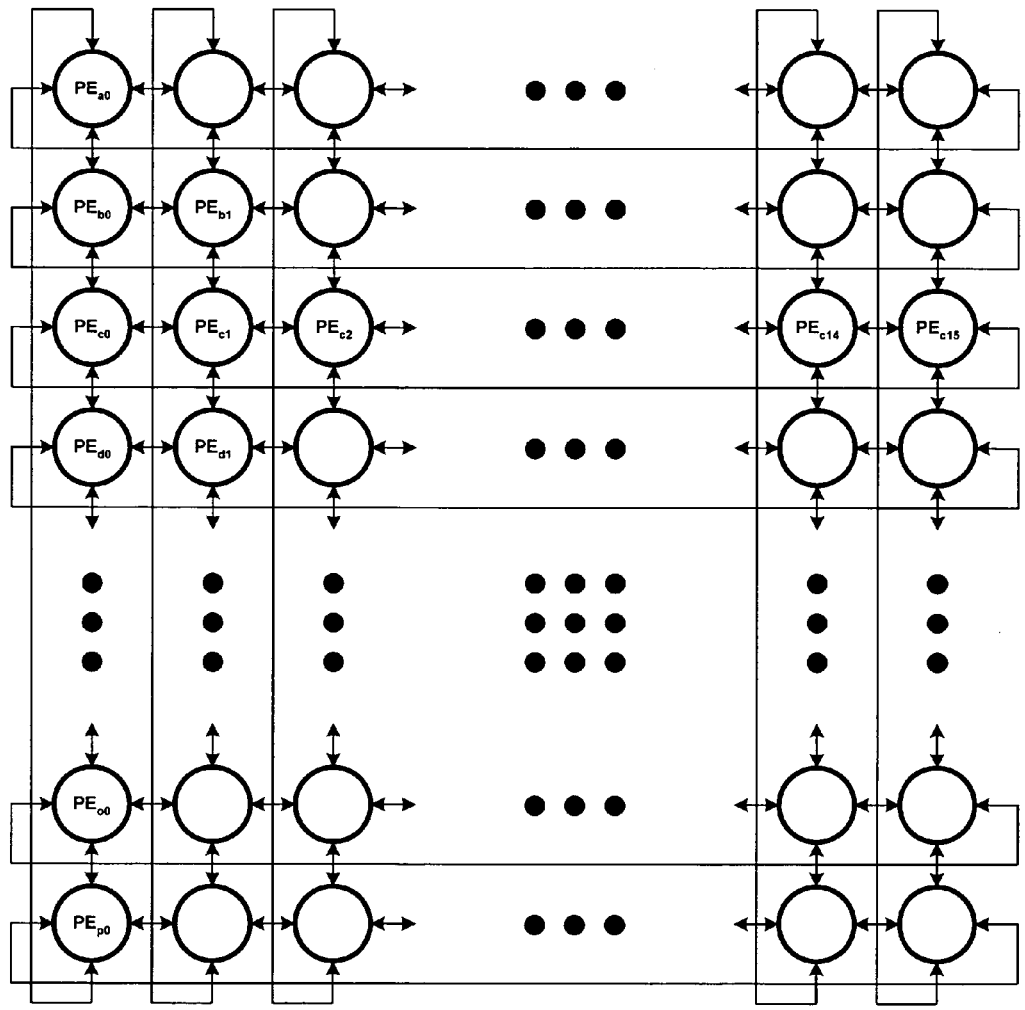
FIG. 7 illustrates processing elements of FIG. 2 arranged in a loop-connected two-dimensional array according to an embodiment of the present invention.

The transfer network refers to the interconnections which allow PEs to communicate with each other via their associated X registers. Referring briefly to FIG. 7 for example, the loop connected 16×16 2-D array 28 for the current embodiment is illustrated. A loop connected array refers to an array whose edge PEs (e.g., those in the first and last rows and the first and last columns) have a similar level of connectivity as non-edge arrays. FIG. 7 illustrates the connectivity of the rows and columns, respectively, of the array 28. More specifically in the loop connected 2-D array 28, the connections between edge PEs "wrap" around the column and rows, thus, both edge and non-edge PEs can transfer data to four neighboring PEs. For example in FIG. 7, $PE_{c1}$ is a non-edge PE which can communicate with its neighbors to the north (i.e., $PE_{b1}$), south (i.e., $PE_{d1}$), east (i.e., $PE_{c2}$), and west (i.e., $PE_{c0}$) and even though $PE_{c0}$ is an edge PE, $PE_{c0}$ can communicate with it neighbors to the north (i.e., $PE_{b0}$), south, (i.e., $PE_{d0}$), east (i.e., $PE_{c1}$), and west (i.e., $PE_{c15}$) due to the loop connection. It should be noted that loop connection for an n-dimensional array provides 2n neighbors for each PE (i.e., two neighbors in each dimension).

It should be noted that the number of PEs 30 included in array 28 may be altered while remaining within the scope of the present invention. Additionally, the number of dimensions for array 28 may be varied while remaining with the scope of the present invention. It should be further noted that each PE 30 is interconnected with its neighboring PEs via an associated X-register link. Accordingly, information can be shared among the PEs. It should be noted that the information may flow in any direction (i.e., north-to-south, south-to-north, east-to-west, and west-to-east) while remaining within the scope of the present invention.

Returning to FIG. 3, the X register is loaded through the X multiplexer (XMP) which selects one of the output of registers R0, R1, and R2 and the output of multiplexer 48, among others. It should be noted that multiplexer 48 receives signals XS, XE, XN, and XW from the transfer network. For example, XS represents the X_Out output from the instant PE's southern neighbor, XE represents the X_Out output from the instant PE's eastern neighbor, etc.

ALU 32 includes a 16-bit multiplier adder ("MA") and a logic unit, among others. In the current embodiment, the MA is designed to allow two's-compliment addition or subtraction and signed magnitude addition or subtraction. The logic unit is designed to allow logical functions between two arguments such as bit-wise OR and AND functions, among others. Condition logic 38 includes Z, N, and C flag registers, as well as an SCR register. As illustrated, the MA and the logic unit communicate with the C flag register via multiplexer 56 and with the SCR register and the result pipe 40 via multiplexer 58.

It should be noted that the detailed illustrated of PE 30 in FIG. 3 has a number of components, signal lines, and connections omitted for clarity. It should be apparent to those skilled in the art that additional components, signal lines, and connections may added while remaining within the scope of the present invention.

Figure 4:
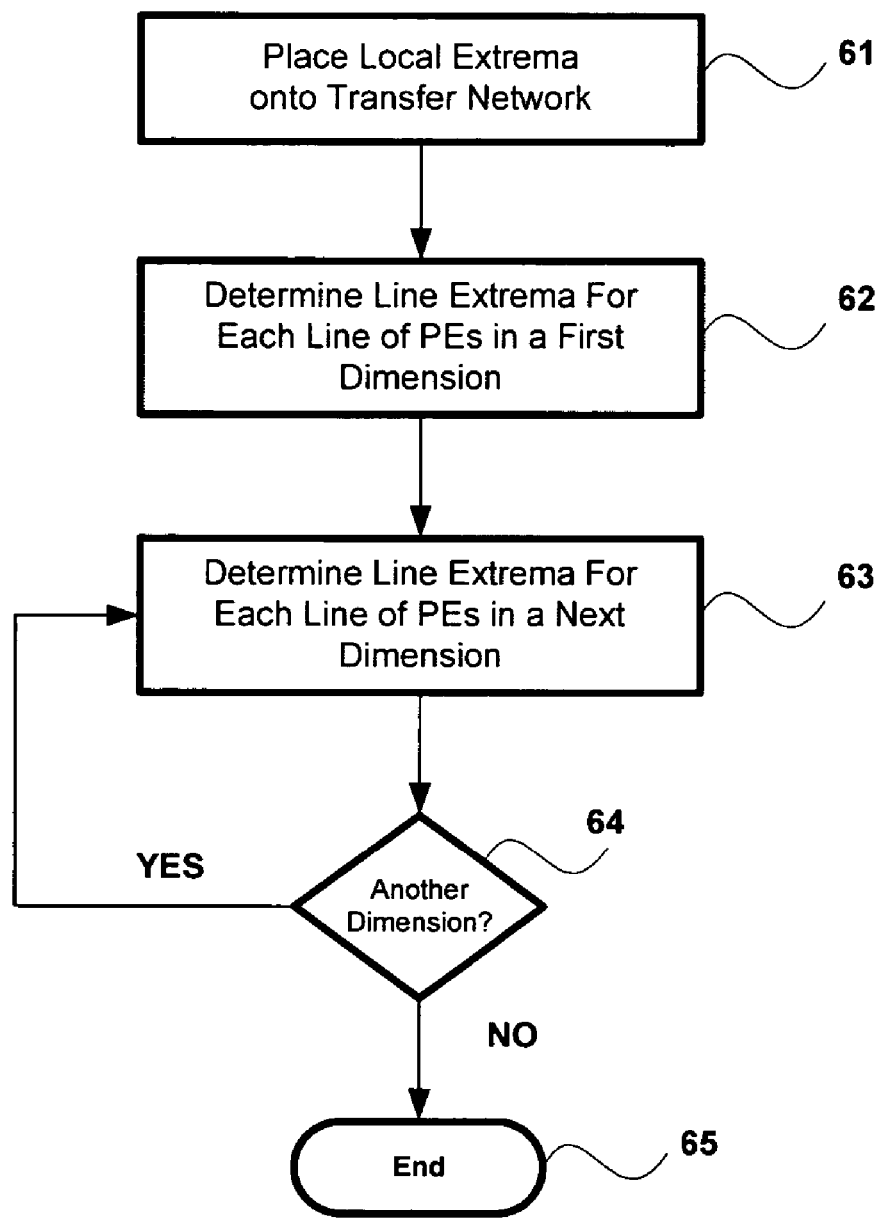
FIG. 4 illustrates an operational process for determining a global extrema for an array of processing elements according to an embodiment of the present invention.

FIG. 4 illustrates an operational process 60 for determining a global extrema for an array of processing elements according to an embodiment of the present invention. Operational process 60 begins when the local extrema for each PE is placed onto the transfer network in operation 61.

For example in the current embodiment, each PE in array 28 (see FIG. 7) receives a set of values from the DRAM interface 44 and the host memory access port 46 (see FIG. 1), among others. After the values are assigned to each PE in the array 28, each PE determines its local extrema. In the current embodiment, local extrema refers to the maximum or minimum value for a set of values assigned to an individual PE. A method for determining a local extrema from a set of values on an individual PE is discussed in more detail in U.S. patent application Ser. No. 10/689,335 entitled "Method for Finding Local Extrema of a Set of Values for a Parallel Processing Element" filed 20 Oct. 2003 and incorporated in its entirety by reference herein.

In the current embodiment, each local extrema is a 16-bit value and is referred to as a "short." As discussed above, the PEs used in the current embodiment are an 8-bit processing elements. Thus, each short is processed as two separate bytes, a "most significant" MS byte and a "least significant" (LS) byte. The convention used in the current alternative embodiment is known as "big-endian", that is the MS byte is stored in the LS-register file address. It should be noted that other methods of finding the local extrema for each PE may be utilized while remaining within the scope of the present invention.

Once the local extrema has been determined, each PE places its local extrema onto the transfer network in operation

61. For example in the current embodiment, each PE uses its associated X register to place its local extrema onto the transfer network.

After each PE places its local extrema on the transfer network, an extrema is determined for each line in a first dimension of the array in operation 62. In the current embodiment, for example, each PE compares its local extrema to the local extrema of the other PEs within its row to determine a row extrema (i.e., for its associated row). Each PE transmits its local extrema via the transfer network to each other PE within the same row. Thus, each PE within the same row will calculate same row extrema as the other PEs within that row.

For example referring to FIG. 7, assume that the local extremas for the PEs in row-c (i.e., the third row) are determined as follows: $PE_{c0}=2$, $PE_{c1}=5$, $PE_{c2}=1$, $PE_{c3}=6$, $PE_{c4}=3$, $PE_{c5}=2$, $PE_{c6}=4$, $PE_{c7}=5$, $PE_{c8}=3$, $PE_{c9}=5$, $PE_{c10}=3$, $PE_{c11}=4$, $PE_{c12}=0$, $PE_{c13}=1$, $PE_{c14}=4$, $PE_{c15}=5$. Accordingly, the local extremas for row-c may be represented by the set of values $\{2, 5, 1, 6, 3, 2, 4, 5, 3, 5, 3, 4, 0, 1, 4, 5\}$. Each PE within row-c (i.e., $PE_{c0}$-$PE_{c15}$) receives via the transfer network, and determines the row extrema from, this set of values.

It should be noted that each PE will receive the set of values in a different order. Referring to FIG. 7, for example, consider the embodiment where the data is moved from right to left. $PE_{c2}$ will see its own value (i.e., 1), followed by values moving in from the right hand side so the order of the set of values for $PE_{c2}$ will be $\{1, 6, 3, 2, 4, 5, 3, 5, 3, 4, 0, 1, 4, 5, 2, 5\}$. $PE_{c3}$ will receive the same set of values, however, $PE_{c3}$ will see its own value (i.e., 6), followed by values moving in from the right hand side. Thus, the order of the set of values for $PE_{c3}$ will be $\{6, 3, 2, 4, 5, 3, 5, 3, 4, 0, 1, 4, 5, 2, 5, 1\}$. The specific order of the set of values for the remaining PEs may be found in a similar manner.

In operation 62, each PE in a row receives a set of values from the transfer network and simultaneously determines the row extrema for its associated row. For simplicity, the current discussion will be limited to finding the high row extrema for the array 28, however, it should be noted that a low row extrema may be determined while remaining within the scope of the present invention. For example, each PE in row-c receives the set of values $\{2, 5, 1, 6, 3, 2, 4, 5, 3, 5, 3, 4, 0, 1, 4, 5\}$ and determines that the high row extrema for row-c is equal to 6 in operation 62. It should be noted that the PEs in the other rows of array 28 simultaneously determine the row extrema for their associated row.

After a line extrema is found for each line for a first dimension in the array, a line extrema is found for each line for a next dimension in the array in operation 63. For example in the current embodiment, each PE determines the column extrema for its associated column by comparing its row extrema (as calculated in operation 62) to the row extrema of the other PEs within its column. Each PE transmits its row extrema via the transfer network to each other PE within the same column. Thus, each PE within the same column will calculate same column extrema as the other PEs within that column.

Again referring to FIG. 7, assume that the row extremas for the array 28 are determined in operation 62 as follows: row-a=7, row-b=3, row-c=6, row-d=4, row-e=5, row-f=4, row-g=2, row-h=3, row-i=6, row-j=4, row-k=2, row-l=3, row-m=5, row-n=1, row-o=2, row-p=3. Accordingly, the row extremas for the array 28 may be represented by the set of values $\{7, 3, 6, 4, 5, 4, 2, 3, 6, 4, 2, 3, 5, 1, 2, 3\}$. In operation 63, each PE in the column receives the set of row extrema values via the transfer network and determines the column extrema from this set. In the instant example, each PE determines that the high column extrema is equal to 7. It should be noted that the low column extrema (here equal to 1) may also be determined while remaining within the scope of the present invention.

Operational process 60 then continues with determination process 64. If the array has another dimension, control branches YES and operation 63 is repeated for the next dimension. If the array does not have another dimension, control branches NO and operation 65 terminates operational process 60.

It should be noted that, for the 2-dimensional array in the instant example, the value of the column extrema also represents the value of the array extrema (i.e., each PE will have as its column extrema the local extrema value from PE having the largest local extrema (i.e., high array extrema) or smallest local extrema (i.e., low array extrema)).

As mentioned above, the local extrema for each PE is a short (i.e., 16-bits) which may be separated into a MS byte and a LS byte. It should be noted that each dimensional extrema is also a short. The shorts, as seen by each PE in the current embodiment, are in binary format. For simplicity, however, the shorts are represented in decimal format in the instant discussion. Accordingly, the set may be represented as $\{short-1, short-2, short-3, \ldots short-16\}$, where the numerals 1-16 represent each short's location within the set.

The position of each value within the value set may be designated as $\{1, 2, 3, 4, \ldots N\}$ and thus, depending on its position within the set, a value may be designated as either "odd numbered" or "even numbered." For example, an "odd numbered value" refers to those values located at an odd numbered position within the value set. The odd numbered values for $PE_{c2}$ in the current embodiment, for example, are values $\{1, 3, 4, 3, 3, 0, 4, 2\}$ which are located at odd numbered positions 1, 3, 5, 7, 9, 11, 13, and 15 respectively in $PE_{c2}$'s data set. Because the local extrema are obtained in a different order for each PE, the odd numbered values for $PE_{c3}$ in the current embodiment, however, are values $\{6, 2, 5, 5, 4, 1, 5, 5\}$ which are located at the odd numbered positions 1, 3, 5, 7, 9, 11, 13, and 15, respectively, in $PE_{c3}$'s data set. Similarly, an "even numbered value" refers to those values located at an even numbered position within the value set. The even numbered values for $PE_{c2}$ in the current embodiment, for example, are values $\{6, 2, 5, 5, 4, 1, 5, 5\}$ which are located at even numbered positions 2, 4, 6, 8, 10, 12, 14, and 16, respectively, in $PE_{c2}$'s data set. The even numbered values for $PE_{c3}$ in the current embodiment, however, are values $\{3, 4, 3, 3, 0, 4, 2, 1\}$ which are located at the even numbered positions 2, 4, 6, 8, 10, 12, 14, and 16, respectively, in $PE_{c3}$'s data set.

It should be noted that in the current embodiment the local and dimensional extrema for each PE are placed on the transfer network one byte at a time. For example in operation 61, the LS-byte of each local extrema is placed on the transfer network and transferred to one or more PEs within the array. The MS-byte of each local extrema is later placed on the transfer network and transferred to one or more PEs within the array.

It should further be noted that the order in which the LS-bytes and the MS-bytes are placed onto the transfer network and the number of PEs to which the bytes are transferred to may be altered while remaining within the scope of the present invention. For example in the current embodiment, the LS and MS bytes are transferred in bursts. The burst length may be selected to approximately equalize the number of lost transfer cycles and the number of lost ALU cycles. This effectively reduces the number of lost transfer cycles as compared to the first approach discussed above. Additionally by using bursts, the ALU can start comparing shorts more quickly as compared to the second approach discussed above, thus reducing the number of lost processing cycles. Once the ALU is started, the use of bursts helps to minimize the time that the ALU is required to wait for data.

In the current embodiment, the LS bytes and MS bytes are alternately bursted. The size of each burst is selected to fill the local memory. For example, LS bytes are bursted until all local registers (R0,R1,R2) are full, then MS bytes are bursted until local registers are full, then LS bytes are bursted until local registers are full, etc. until all shorts have been processed.

It should be noted that the resources of an array of parallel processing elements may be "maximized" in various ways. For example, where the input data arrives via the transfer network, maximization may occur when the number of lost cycles of each processor is approximately equal to the number of lost cycles for the transfer network, among others. Alternatively where the input data is read from the register file 42, maximization may occur when the number of lost cycles for each processor is approximately equal to the number of cycles lost while reading from the register file 42. For example, the resources of a PE may be maximized (as disclosed in "Method for Finding Local Extrema of a Set of Values for a Parallel Processing Element" (DB001076-000, Micron no. 03-0052)) such that zero cycles are lost when reading from the register file 42.

In the current embodiment, "maximization" is achieved using a burst 6 bytes in length. Once started, for continuous operation, a further seven (7) cycles are required to transfer a burst six (6) bytes in length (i.e., the resources of the PE are maximized such that approximately only one (1) in seven (7) cycles is lost). For sixteen (16) shorts, the current embodiment is completed after approximately (7×16×2/6)=37.33 cycles. It should be noted that for every three (3) further shorts there is one cycle lost on the transfer network and one cycle lost in the ALU. It should further be noted that in any practical implementation 'end effects' occur. That is, when the algorithm is initialized, and when it is terminated, additional cycles may be required. For example to process the sixteen (16) shorts in the current embodiment, the transfer network and the ALU both require thirty-five (35) cycles. However, the transfer network operates for nine (9) cycles before the ALU begins to operate. Also a single 'housekeeping' cycle is present at the termination of the algorithm. Accordingly, a total of (9+35+1)=45 cycles are completed in the current embodiment.

It should be apparent to one skilled in the art that in an alternative embodiment the order of operations 62 and 63 may be reversed while remaining within the scope of the present invention. For example, the column extrema may be found first. The set of column extrema are then used to determine the row extrema. In the instance in which order of operations 62 and 63 are reversed, the value determined for the row extrema also represents the value of the array extrema.

It should further be noted that the present invention may be employed for arrays of other sizes and shapes. For example, the present invention may be used to balance an K×L× M× . . . etc., n-dimensional array of processing elements (PEs), wherein K represents the number of PEs on a line traversing a first dimension of the array, L represents the number of PEs on a line traversing a second dimension of the array, M represents the number of PEs on a line traversing a third dimension of the array, etc. More generally, the present invention may be used to balance and an array having (N) PE's traversing each line in a dimension, where N may be different for each dimension.

One example may be a 3×5×7 array in which the array is comprised of three (3) lines in a first dimension, five (5) lines in a second dimension, and seven (7) lines in a third dimension. Applying operational process 60 to the 3×5×7 array, each PE calculates the extrema for its row (i.e., the first dimension) using the local extrema of the other PEs in the associated row. Next, each PE calculates the extrema for its column (i.e., the second dimension) using the row extrema of the other PEs in the associate column. Then, each PE calculates the extrema for its line in the third dimension using the column extrema of the other PEs in its third dimensional line.

Figure 5:
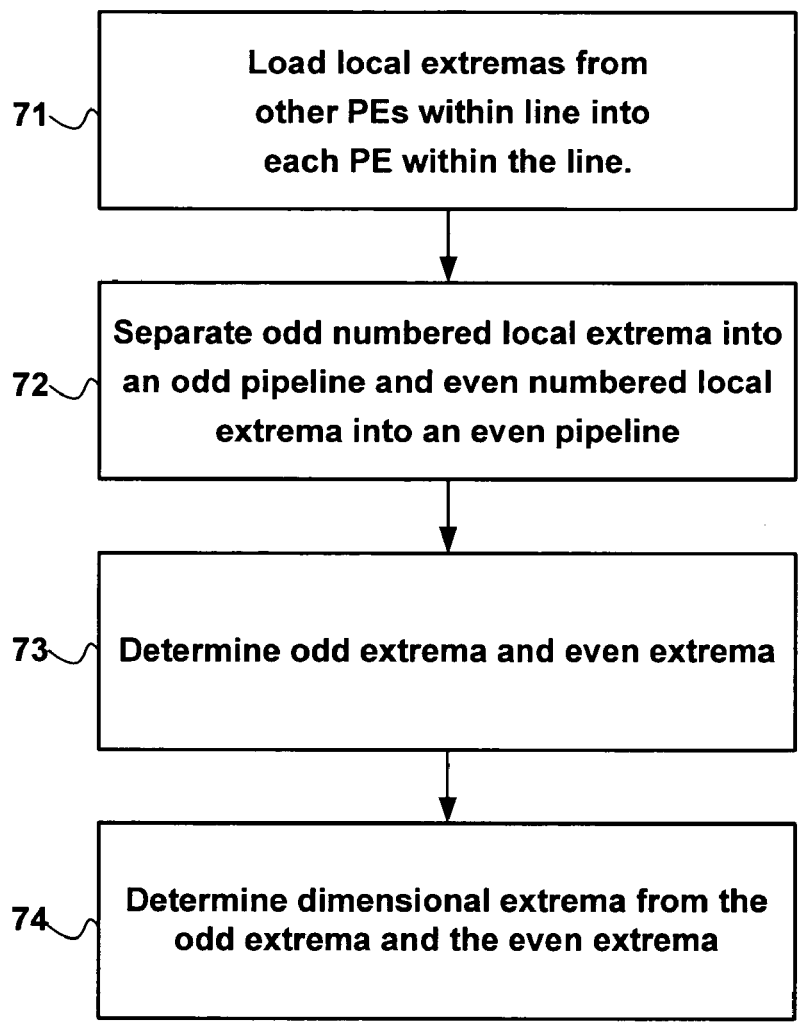
FIG. 5 is an operational process for determining an extrema of a single dimension of an n-dimensional array of processing elements according to an embodiment of the present invention.

FIG. 5 illustrates an operational process 70 for determining a dimensional (e.g., row, column, line, etc.) extrema of a single dimension within an N-dimensional array of processing elements according to an embodiment of the present invention. For example, operational process 70 may be used by a processing element to determine the row extrema for an associated row as previously discussed in conjunction with operation 63 above. Likewise, operational process 70 may be used by a processing element to determine the column extrema for an associated column as previously discussed in conjunction with operation 64 above.

For simplicity, the current embodiment of operational process 70 will be discussed in conjunction with finding the dimensional extrema of row-c of array 28. More specifically, the dimensional extrema of row-c as determined by processing element $PE_{c0}$ will be discussed.

Operational process 70 begins when each PE within the row receives the input values (i.e., the local extrema shorts) from the other PEs within the associated row in operation 71. As discussed above, each PE receives the same values but in a different order. For example in the current embodiment, $PE_{c0}$ receives the set of values {2, 5, 1, 6, 3, 2, 4, 5, 3, 5, 3, 4, 0, 1, 4, 5}, $PE_{c1}$ receives the set {5, 1, 6, 3, 2, 4, 5, 3, 5, 3, 4, 0, 1, 4, 5, 2}, $PE_{c2}$ receives the set {1, 6, 3, 2, 4, 5, 3, 5, 3, 4, 0, 1, 4, 5, 2, 5}, etc.

In operation 72, the odd numbered local extrema shorts are placed into an odd pipeline and the even numbered local extrema shorts are placed into an even pipeline. Each pipeline is made up of one or more registers (among others). $PE_{c0}$ having the input value set {2, 5, 1, 6, 3, 2, 4, 5, 3, 5, 3, 4, 0, 1, 4, 5}, for example, places short-1 (i.e., 2), short-3 (i.e., 1), short-5 (i.e., 3), short-7 (i.e., 4), short-9 (i.e., 3), short-11 (i.e., 3), short-13 (i.e., 0), and short-15 (i.e., 4) into its odd pipeline and short-2 (i.e., 5), short-4 (i.e., 6), short-6 (i.e., 2), short-8 (i.e., 5), short-10 (i.e., 5), short-12 (i.e., 4), short-14 (i.e., 1), and short-16 (i.e., 5) into its even pipeline.

Once the shorts are separated into the odd and even pipelines in operation 72, an odd extrema is determined for the shorts within the odd pipeline and an even extrema is determined for the shorts within the even pipeline in operation 73. In the current embodiment, the ALU is used to compare the odd-numbered shorts to the other odd numbered shorts and the odd extrema is determined. Likewise, the ALU is used to compare the even-numbered shorts to the other even numbered shorts and the even extrema is determined. For example for row-c, the high odd extrema is determined to be four (4) (i.e., short-7 and short-15), whereas the high even extrema is determined to be six (6) (i.e., short-4).

The odd and even extrema determined in operation 73 are then compared to each other and a dimensional extrema is determined in operation 74. For example in the current embodiment, the high odd and high even extrema determined in operation 73 are compared to each other to determine a high row extrema of six (6) for row-c.

It should be noted that each short within the odd and even pipelines may further be divided into a LS-byte and a MS-byte. For example, the odd extrema may be stored within two registers which may further be initialized with the LS-byte and the MS-byte, respectively, of the first short placed in the odd pipeline (e.g., short-1). Then, the LS-byte of short-1 may be compared to the LS-byte of the next short (e.g., short-3) within the odd pipeline. Depending on the result, the value of a carry flag may be set. Using the carry flag value, the MS-byte of short-1 may then compared to the MS-byte of short-3. Depending on the result, the value an odd flag may be set. The registers containing the odd extrema may be updated with the new short (e.g., short-3) or may continue to hold their current values (e.g., short-1) depending on the value of the odd flag. The even pipeline may function in a similar manner with the even shorts.

After reading the following discussion, it should become apparent to those skilled in the art that operational process 70 may be implemented simultaneously by each processor in the array 28, and that operational process 70 may be applied to other sizes of arrays and other types of arrays (e.g., non-square N-dimensional arrays) while remaining within the scope of the present invention.

FIGS. 6a-6h graphically represent operational process 70 as applied to a single line of array 28 as illustrated in FIG. 7 according to an embodiment of the present invention. More specifically, FIGS. 6a-6h graphically represent operational process 70 as applied to array 28 to determine the row extrema of row-c as implemented by $PE_{c0}$.

As illustrated in FIGS. 6a-6h, the movement of the information throughout the PE is divided into a series of clock pulse, or cycles. It should be noted that all operations within a cycle happen simultaneously. Thus if a register is being "read from" and "written to" in the same cycle, the "old" data moves out of the register at the same time that the "new" data moves into the register. Accordingly, the old data is not lost. In the current embodiment, the old contents of a particular register will be that value written to the register during the cycle immediately preceding the current cycle. If a value was not written to the particular register during the cycle immediately preceding the current cycle, the old contents of the register will be the last value written to the register during the closest preceding cycle to the current cycle.

With clock pulse number one (1), the PE loads the LS-byte of its local extrema onto the transfer network and the MS-byte of its local extrema into its first result register. As discussed above in conjunction with FIG. 3, the transfer network refers to the interconnections which allows a PE to communicate with its neighboring PEs via their associated X registers. The local extrema is determined, for example, as discussed above in conjunction operation 62 of FIG. 4. In the instant embodiment, the PEs of row-c in array 28 have local extrema represented by the set of values {2, 5, 1, 6, 3, 2, 4, 5, 3, 5, 3, 4, 0, 1, 4, 5}. Accordingly during the first clock pulse, $PE_{c0}$ loads its LS-byte (i.e., $LS_{c0}$) of its local extrema into its X register and its MS-byte (i.e., $MS_{c0}$) of its local extrema into its register R0.

After the PE loads the LS-byte of its local extrema onto the transfer network and the MS-byte of its local extrema into its first result register, the following actions occur simultaneously during clock pulse number two (2): the value within the X register is loaded into a first register and the value of the X register is placed on the transfer network and is shifted around the loop (e.g. row) of the transfer network one PE at a time. This has the effect that the X register receives the next local extrema byte from a PE adjacent on the loop of the transfer network.

For example in the current embodiment, $LS_{c0}$ is loaded from the X register into register R1 via RMP1, $LS_{c0}$ is shifted westward (i.e., towards $PE_{c7}$) via X_Out on the transfer network, and $LS_{c1}$ is loaded into $PE_{c0}$'s X register via multiplexer 48 and XMP. It should be noted that $LS_{c1}$ is the local extrema from $PE_{c0}$'s closest eastern neighbor (i.e., $PE_{c1}$).

The following actions occur simultaneously during clock pulse number three (3): the value in the first register is transferred to a second register, the value within register X is loaded into the first register, and the X register retrieves the next local extrema byte from the transfer network.

In the current embodiment, $LS_{c0}$ is transferred from register R1 to register M2 via multiplexer 54 and multiplexer MMP2, $LS_{c1}$ is transferred from the X register to register R1 via the multiplexer RMP1, and $LS_{c2}$ (i.e., the LS-byte of the local extrema for $PE_{c2}$) is loaded into the X register via multiplexer 48 and XMP.

The following actions simultaneously occur during clock pulse number four (4): the value in register X is loaded into the first register, the value in the first register is loaded into a third register, the value within the second register is loaded into a fourth register, and the X register retrieves the next local extrema byte from the transfer network.

Accordingly in the current embodiment, $LS_{c2}$ is loaded into register R1 via the multiplexer RMP1, $LS_{c1}$ is transferred from register R1 into register M0 via the multiplexer 54 and multiplexer MMP0, $LS_{c0}$ is loaded from register M2 into register Q2, and $LS_{c3}$ (i.e., the LS-byte for the local extrema of $PE_{c3}$) is loaded into the X register via multiplexer 48 and XMP. It should be noted that in the current embodiment register Q2 contains the odd extrema LS-byte. It should further be noted that register Q2 is initialized with the first odd LS-byte that is processed, here $LS_{c0}$.

The following actions simultaneously occur during clock pulse number five (5): the value in register X is loaded into the first register, the value in the first register is transferred into the second register, the value within the third register is loaded into a fifth register, and the X register retrieves the next local extrema byte from the transfer network.

Accordingly in the current embodiment, $LS_{c3}$ is loaded into register R1 via the multiplexer RMP1, $LS_{c2}$ is transferred from register R1 into register M2 via the multiplexer 54 and multiplexer MMP2, $LS_{c1}$ is transferred from register M0 to register Q0, and $LS_{c4}$ (i.e., the LS-byte for the local extrema of $PE_{c4}$) is loaded into the X register via multiplexer 48 and XMP. It should be noted that in the current embodiment register Q0 contains the even extrema LS-byte. It should further be noted that register Q0 is initialized with the first even LS-byte that is processed, here $LS_{c1}$.

During clock pulse number six (6), the following actions simultaneously occur: the value in register X is loaded into a sixth register, the value in the first register is transferred into the third register, and the X register retrieves the next local extrema byte from the transfer network.

Accordingly in the current embodiment, $LS_{c4}$ is loaded into register R2 via the multiplexer RMP2, $LS_{c3}$ is transferred from register R1 into register M0 via the multiplexer 54 and multiplexer MMP0, and $LS_{c5}$ (i.e., the LS-byte for the local extrema of $PE_{c5}$) is loaded into the X register via multiplexer 48 and XMP. As is apparent from FIGS. 6a and 6b, the first burst of LS bytes are transferred during clock pulse number two (2) through clock pulse number six (6).

During clock pulse number seven (7), the following actions simultaneously occur: the value in register X is loaded into the first register and the value in the first result register is loaded into the X register.

Accordingly in the current embodiment, $LS_{c5}$ is loaded into register R1 via the multiplexer RMP1 and $MS_{c0}$ (i.e., the MS-byte for the local extrema of $PE_{c0}$) is transferred from register R0 into the X register via multiplexer XMP.

During clock pulse number eight (8), the following actions simultaneously occur: the value in register X is loaded into the first register, the value in the first register is transferred into the ALU which updates the first result register with the transferred value, and the X register retrieves the next local extrema from the transfer network.

Accordingly in the current embodiment, $MS_{c0}$ is loaded into register R1 via the multiplexer RMP1, $LS_{c5}$ is transferred into the ALU which updates register R0 with $LS_{c5}$, and $MS_{c1}$ (i.e., the MS-byte for the local extrema of $PE_{c1}$) is loaded into the X register via multiplexer XMP.

The following actions simultaneously occur during clock pulse number nine (9): the value in register X is loaded into the first register, the value in the first register is transferred to a seventh register, and the X register retrieves the next local extrema from the transfer network.

Accordingly in the current embodiment, $MS_{c1}$ is loaded into register R1 via the multiplexer RMP1, $MS_{c0}$ is transferred from R1 to register M3 via the multiplexer 54 and multiplexer MMP3, and $MS_{c2}$ is loaded into the X register via multiplexer XMP.

The following actions simultaneously occur during clock pulse number ten (10): the value in register X is loaded into the first register, the value in the first register is transferred to an eighth register, the values in the second and the fourth registers are transferred to the ALU and compared, the value in the seventh register is transferred to the ninth register and the X register retrieves the next local extrema from the transfer network.

Accordingly in the current embodiment, $MS_{c2}$ is loaded into register R1 via the multiplexer RMP1, $MS_{c1}$ is transferred from register R1 to register M1 via multiplexer 54 and multiplexer MMP1, $LS_{c0}$ and $LS_{c2}$ are transferred to the ALU and compared, $MS_{c0}$ is transferred from register M3 to register Q3 via multiplexer QMP3, and $MS_{c3}$ is loaded into the X register via multiplexer XMP. It should be noted that in the current embodiment register Q3 contains the odd extrema MS-byte. It should further be noted that register Q3 is initialized with the first odd MS-byte that is processed, here $MS_{c0}$.

In the current embodiment, the values loaded into the ALU (i.e., $LS_{c0}$ and $LS_{c2}$) are compared using the Multiplier/Adder (MA) and Logic Unit. For example, the MA subtracts the value contained in the second register (i.e., M2) from the value contained in the fourth register (i.e., Q2). If the result is negative (i.e., if the value within second register is greater than the value within the fourth register), then the carry flag (i.e., flag C in the control logic 38) is set to zero (0). If the result is positive or zero (i.e., the value within the fourth register is greater than or equal to the value within the second register), then the carry flag is set to one (1).

For example in the instant case, $LS_{c0}$ (which is contained in the fourth register, Q2) and $LS_{c2}$ (which is contained within the second register, M2) are loaded into the MA. The value within M2 is subtracted from the value within Q2 (i.e., Q2-M2) and the carry flag is set to zero (0) if the result is negative and set to one (1) if the result is positive or zero. It should be apparent to those skilled in the art that other types of comparisons may be used while remaining within the scope of the present invention, for example, subtracting Q2 from M2.

During clock pulse number eleven (11), the following actions simultaneously occur: the value in register X is loaded into the first register, the value in the first register is transferred to the seventh register, the value in the eighth register is transferred to a tenth register, the values in the first and ninth registers are transferred to the ALU and compared, and the X register retrieves the next local extrema from the transfer network.

Accordingly in the current embodiment, $MS_{c3}$ is loaded into register R1 via the multiplexer RMP1, $MS_{c2}$ is transferred from R1 to register M3 via multiplexer 54 and multiplexer MMP3, $MS_{c1}$ is transferred from register M1 to register Q1 via multiplexer QMP1, $MS_{c2}$ and $MS_{c0}$ are transferred from register R1 and register Q3, respectively, to the ALU and compared, and $MS_{c4}$ is loaded into the X register via multiplexer XMP. It should be noted that in the current embodiment register Q1 contains the even extrema MS-byte. It should further be noted that register Q1 is initialized with the first even MS-byte that is processed, here $MS_{c1}$.

As discussed above in conjunction with clock pulse number 10, the values loaded into the ALU (i.e., $MS_{c2}$ and $MS_{c0}$) are compared using the Multiplier/Adder (MA) and Logic Unit. For example, the MA performs a 'subtract with carry' of the value contained in the first register (i.e., R1) from the value contained in the ninth register (i.e., Q3). If the result is negative (i.e., if the value within first register is greater than the value within the ninth register), then the odd flag (i.e., flag C in the control logic 38) is set to zero (0). If the result is positive or zero (i.e., the value within the ninth register is greater than or equal to the value within the first register), then the odd flag is set to one (1).

It should be noted that the 'subtract with carry' operation is a standard arithmetic algorithm as is known in the art. The subtraction of the MS byte includes the carry bit from the subtraction of the LS bytes as discussed above, for example, in conjunction with clock pulse 10. In the current embodiment, if the carry flag is zero (i.e., signaling a negative result) then an extra value of 1 is subtracted from the result of the MS byte calculation. Other arithmetic operations may be used while remaining within the scope of the present invention.

It should be noted that a comparison of the first odd numbered shorts of the set of values is completed in clock pulses ten (10) and eleven (11). More specifically, the LS-bytes of short-1 and short-3 are compared in clock pulse ten (10), whereas the MS-bytes of short-1 and short-3 are compared in clock pulse eleven (11). Additionally, the second, fourth, seventh, and ninth registers (i.e., registers M2, Q2, M3, and Q3, respectively) form a portion of the odd pipeline.

During clock pulse number twelve (12), the following actions simultaneously occur: the value in register X is loaded into the first register, the value in the first register is transferred to the eighth register, the values in the third and fifth registers are transferred to the ALU and compared, the MS-byte of the odd numbered shorts is conditionally updated, and the X register retrieves the next local extrema from the transfer network.

Accordingly in the current embodiment, $MS_{c4}$ is loaded into register R1 via the multiplexer RMP1, $MS_{c3}$ is transferred from R1 to register M1 via multiplexer 54 and multiplexer MMP1, $LS_{c3}$ and $LS_{c1}$ are transferred from register M0 and register Q0, respectively, to the ALU and compared, register Q3 is conditionally updated with $LS_{c2}$ from register M3 using the odd flag, and $MS_{c5}$ is loaded into the X register via multiplexer XMP.

In the current embodiment, the values loaded into the ALU (i.e., $LS_{c3}$ and $LS_{c1}$) are compared using the Multiplier/Adder (MA) and Logic Unit. For example, the MA subtracts the value contained in the third register (i.e., M0) from the value contained in the fifth register (i.e., Q0). If the result is negative (i.e., if the value within third register is greater than the value within the fifth register), then flag C in the control logic 38 is set to zero (0). If the result is positive or zero (i.e., the value within the fifth register is greater than or equal to the value within the third register), then the carry flag (i.e., flag C in the control logic 38) is set to one (1).

For example in the instant case, $LS_{c1}$ (which is contained in the fifth register, Q0) and $LS_{c3}$ (which is contained within the third register, M0) are loaded into the MA. The value within M0 is subtracted from the value within Q0 (i.e., Q0-M0) and the carry flag is set to zero (0) if the result is negative and set to one (1) if the result is positive or zero. It should be apparent to those skilled in the art that other types of comparisons may be used while remaining within the scope of the present invention, for example, subtracting Q0 from M0.

Additionally during clock pulse number twelve, register Q3 is conditionally updated with $MS_{c2}$. In the current embodiment, the value of the odd flag determined during clock pulse 11 is used to conditionally update the MS-byte of the odd short in the ninth register. For example if the largest value on the PE is to be found (i.e., the high extrema), then the value in the seventh register will be loaded into the ninth register when the odd flag is equal to zero (0), whereas the value within the ninth register will remain in the ninth register when the odd flag is equal to one (1). In this case, the ninth register may be referred to as the "max register for the odd short's MS-byte" because the largest short in the odd pipeline that has thus far been found by the process has its MS-byte stored in the ninth register. For example in the current embodiment where the high extrema of set of shorts (i.e., {2, 5, 1, 6, 3, 2, 4, 5}) within row-c is being determined, the MS-byte of short-1 (which is greater than the MS-byte of short-3) remains within register Q3 because the odd flag is set equal to one (1) during clock pulse number eleven.

Likewise, if the smallest value on the PE is to be found (i.e., the low extrema), then the value in the seventh register will be loaded into the ninth register when the odd flag is equal to one (1), whereas the value within the ninth register will remain in the ninth register when the odd flag is equal to zero (0). In this case, the ninth register may be referred to as the "min register for the odd short's MS-byte" because the smallest short in the odd pipeline that has thus far been found by the process has its MS-byte stored in the ninth register. For example in the current embodiment where the low extrema of set of shorts (i.e., {2, 5, 1, 6, 3, 2, 4, 5}) within row-c is being determined, the MS-byte of short-3 (which is less than the MS-byte of short-1) is loaded into register Q3 because the odd flag is set equal to one (1) during clock pulse number 11.

During clock pulse number (13), the following actions simultaneously occur: the value in register X is loaded into the first register, the value in the first register is transferred to the seventh register, the values in the eighth and tenth registers are transferred to the ALU and compared, the LS-byte of the odd numbered shorts is conditionally updated, and the X register retrieves the next local extrema from the transfer network.

Accordingly in the current embodiment, $MS_{c5}$ is loaded into register R1 via the multiplexer RMP 1, $MS_{c4}$ is transferred from R1 to register M3 via multiplexer 54 and multiplexer MMP3, $MS_{c3}$ and $MS_{c1}$ are transferred to the ALU and compared, register Q2 is conditionally updated with $LS_{c2}$ from register M2, and $MS_{c6}$ is loaded into the X register via multiplexer XMP.

As discussed above in conjunction with clock pulse number twelve, the values loaded into the ALU (i.e., $MS_{c3}$ and $MS_{c1}$) are compared using the Multiplier/Adder (MA) and Logic Unit. For example, the MA subtracts the value contained in the eighth register (i.e., M1) from the value contained in the tenth register (i.e., Q1). If the result is negative (i.e., if the value within eighth register is greater than the value within the tenth register), then the even flag (i.e., flag C in the control logic 38) is set to zero (0). If the result is positive or zero (i.e., the value within the tenth register is greater than or equal to the value within the eighth register), then the even flag is set to one (1).

It should be noted that a comparison of the first even numbered shorts of the set of values is completed in clock pulses twelve and thirteen. More specifically, the LS-bytes of short-2 and short-4 are compared during clock pulse twelve, whereas the MS-bytes of short-2 and short-4 are compared during clock pulse thirteen. It should further be noted that the third, fifth, eighth, and tenth registers (i.e., registers M0, Q0, M1, and Q1, respectively) form a portion of the even pipeline.

Figure 6A:
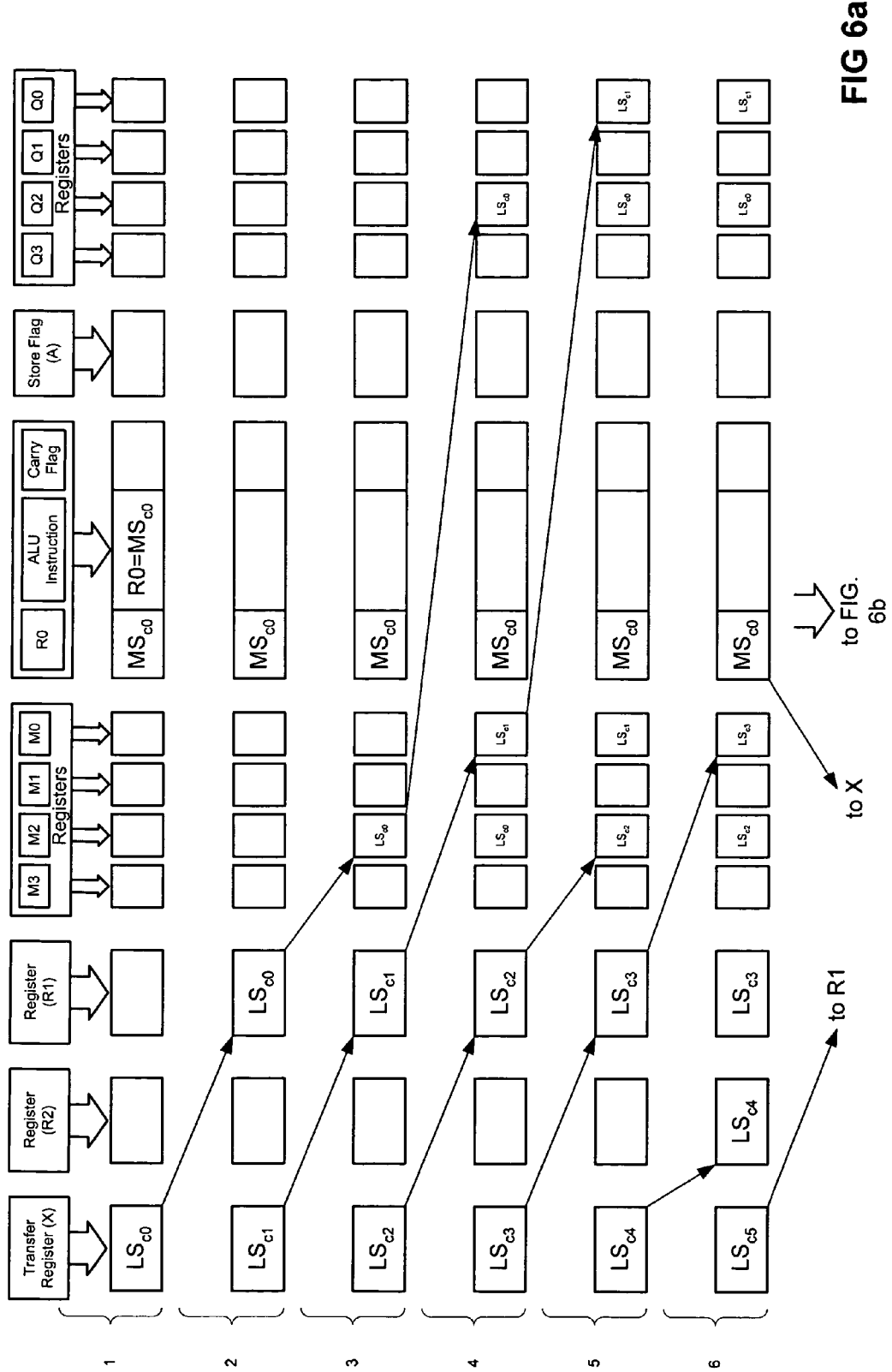
FIGS. 6*a*-6*h* graphically represent the operational process of FIG. 5 as applied to a single line of the array 28 illustrated in FIG. 7 according to an embodiment of the present invention.
Figure 6B:
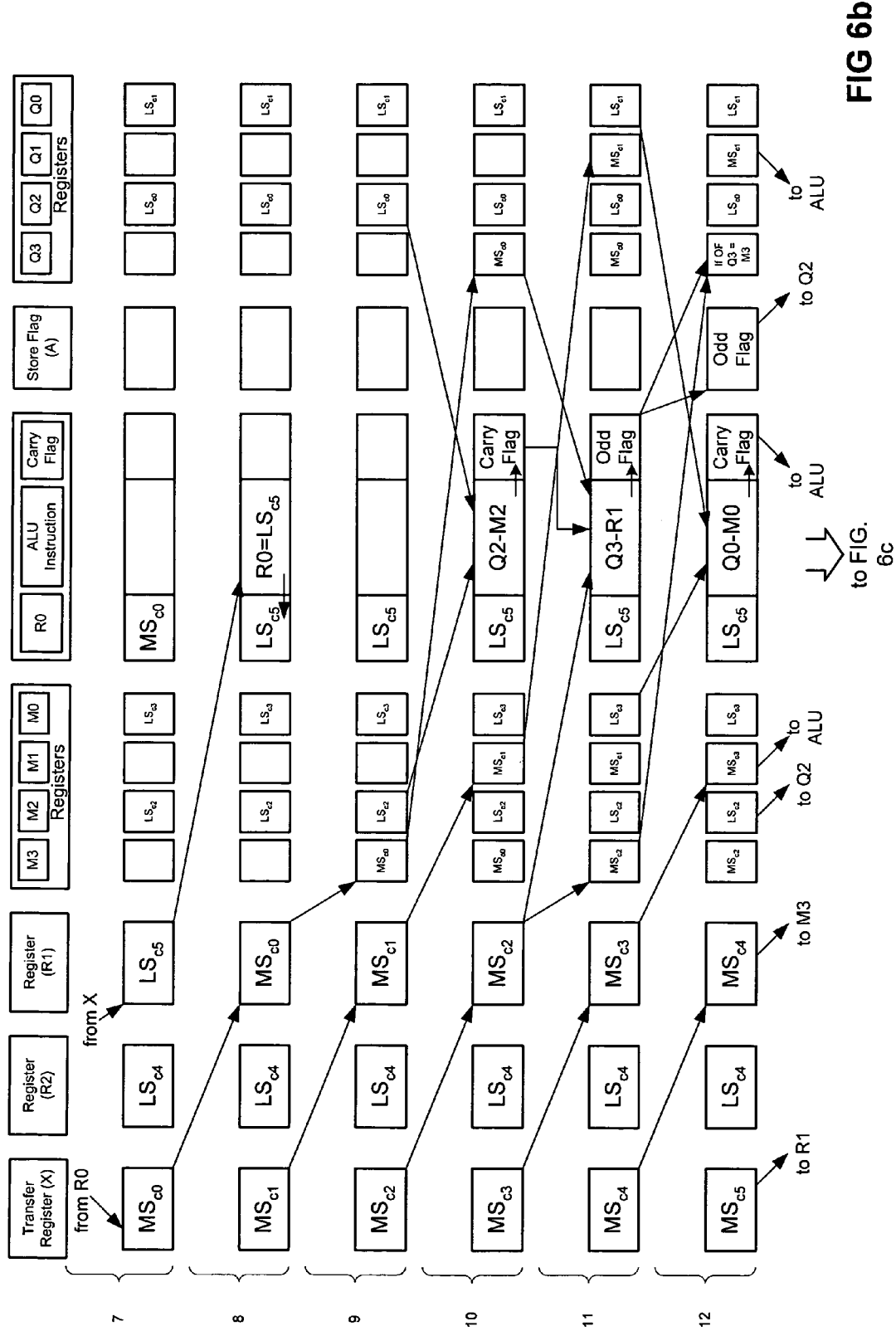
Figure 6C:
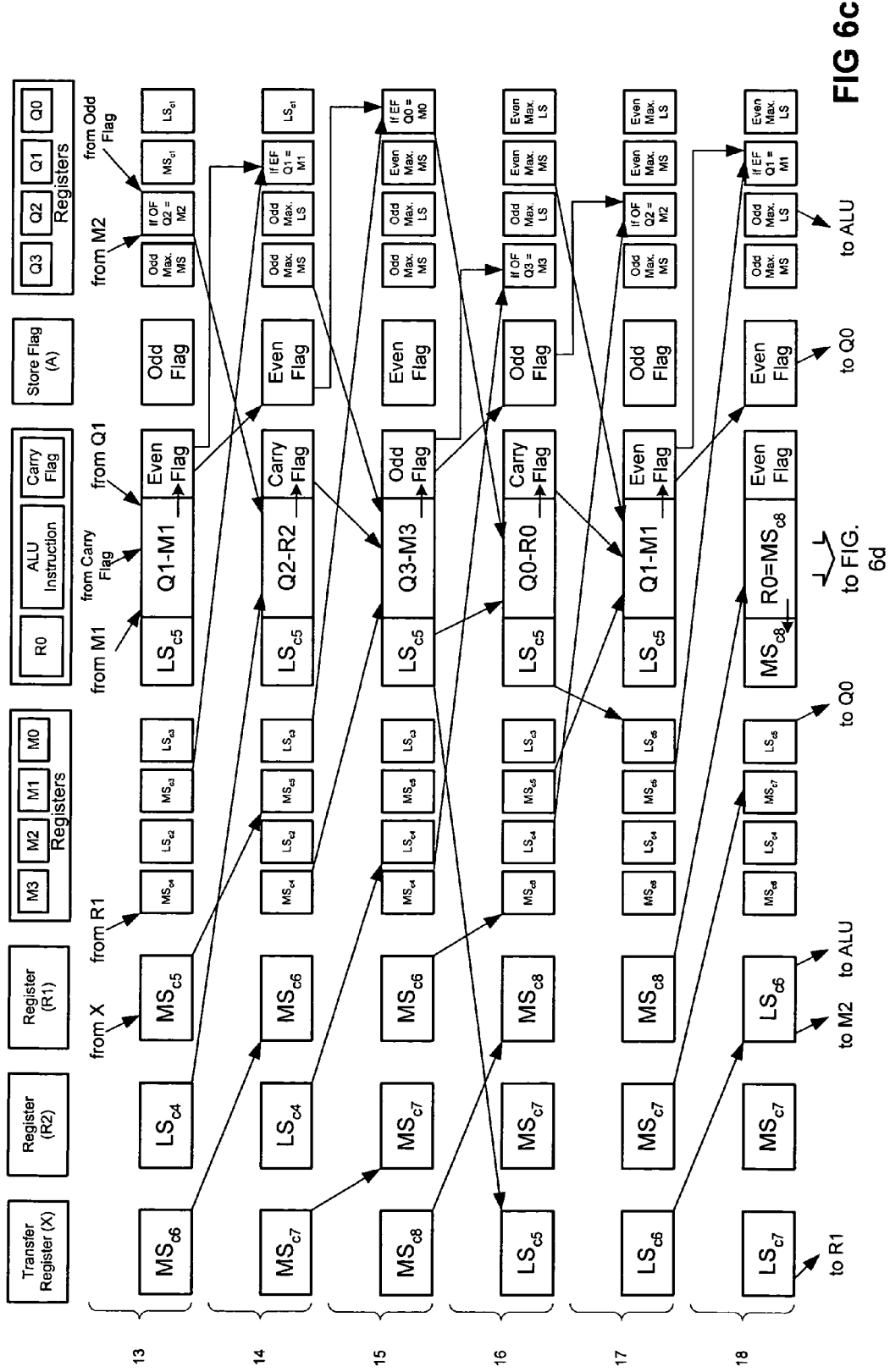
Figure 6D:
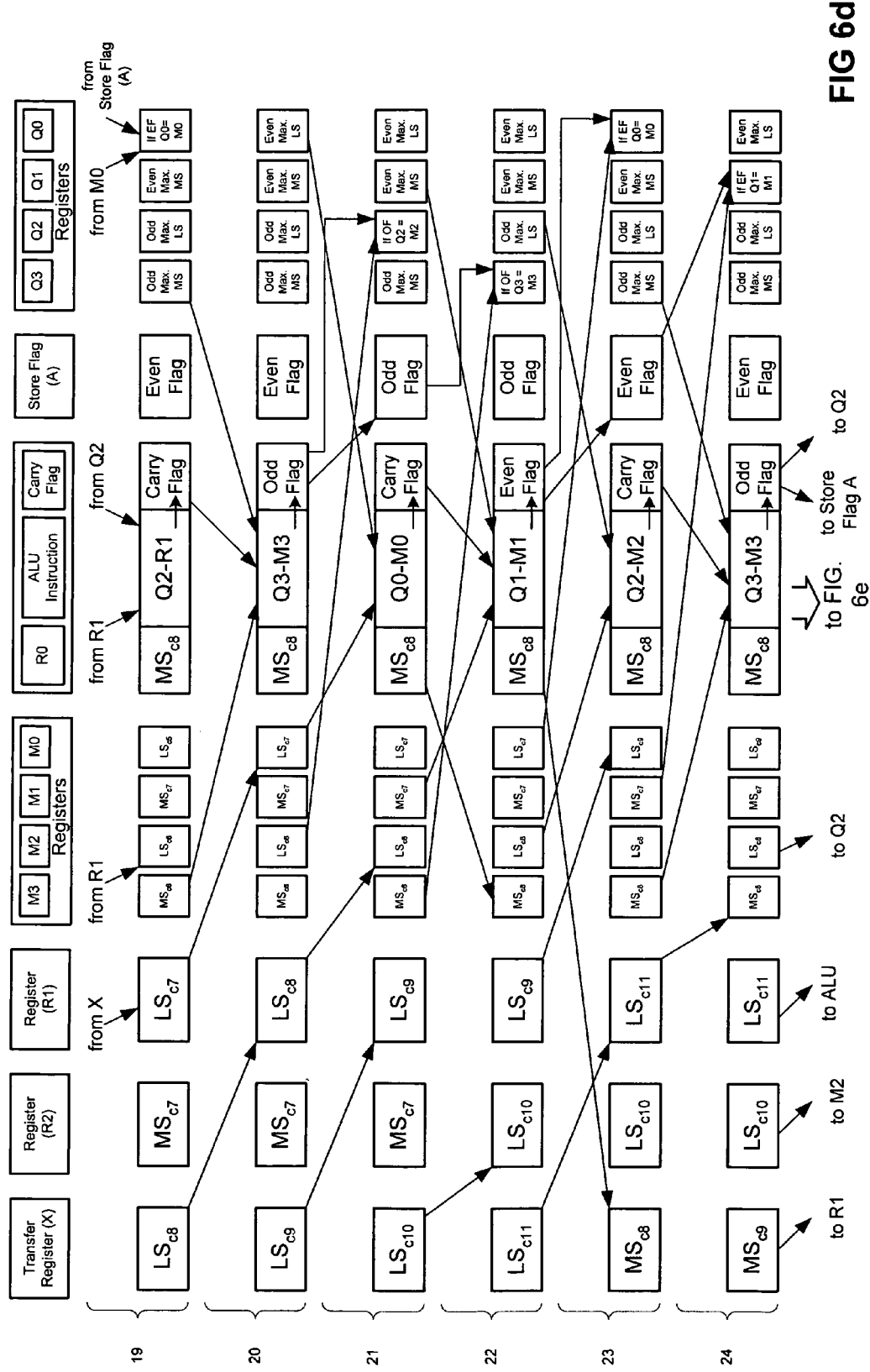
Figure 6E:
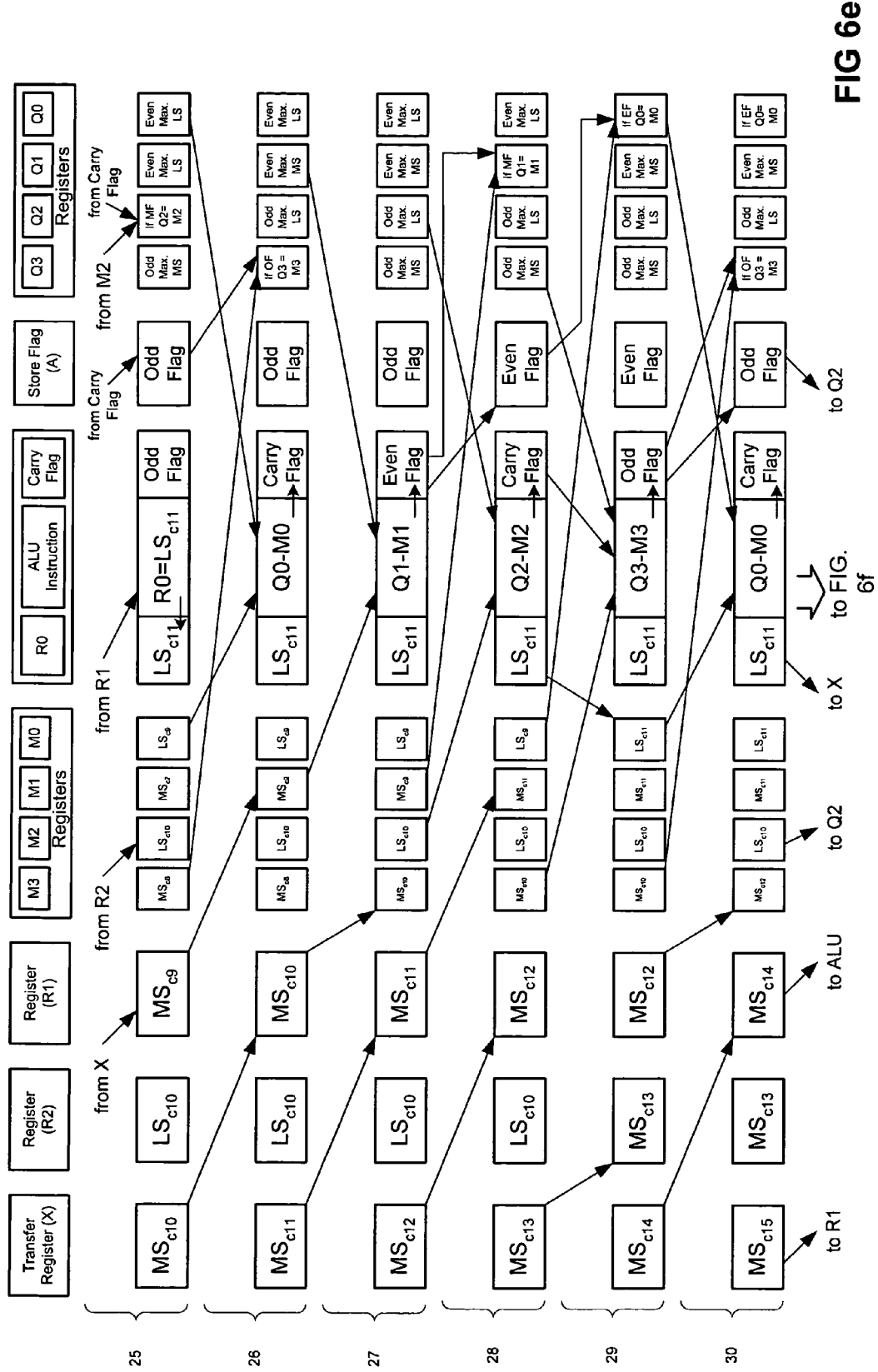
Figure 6F:
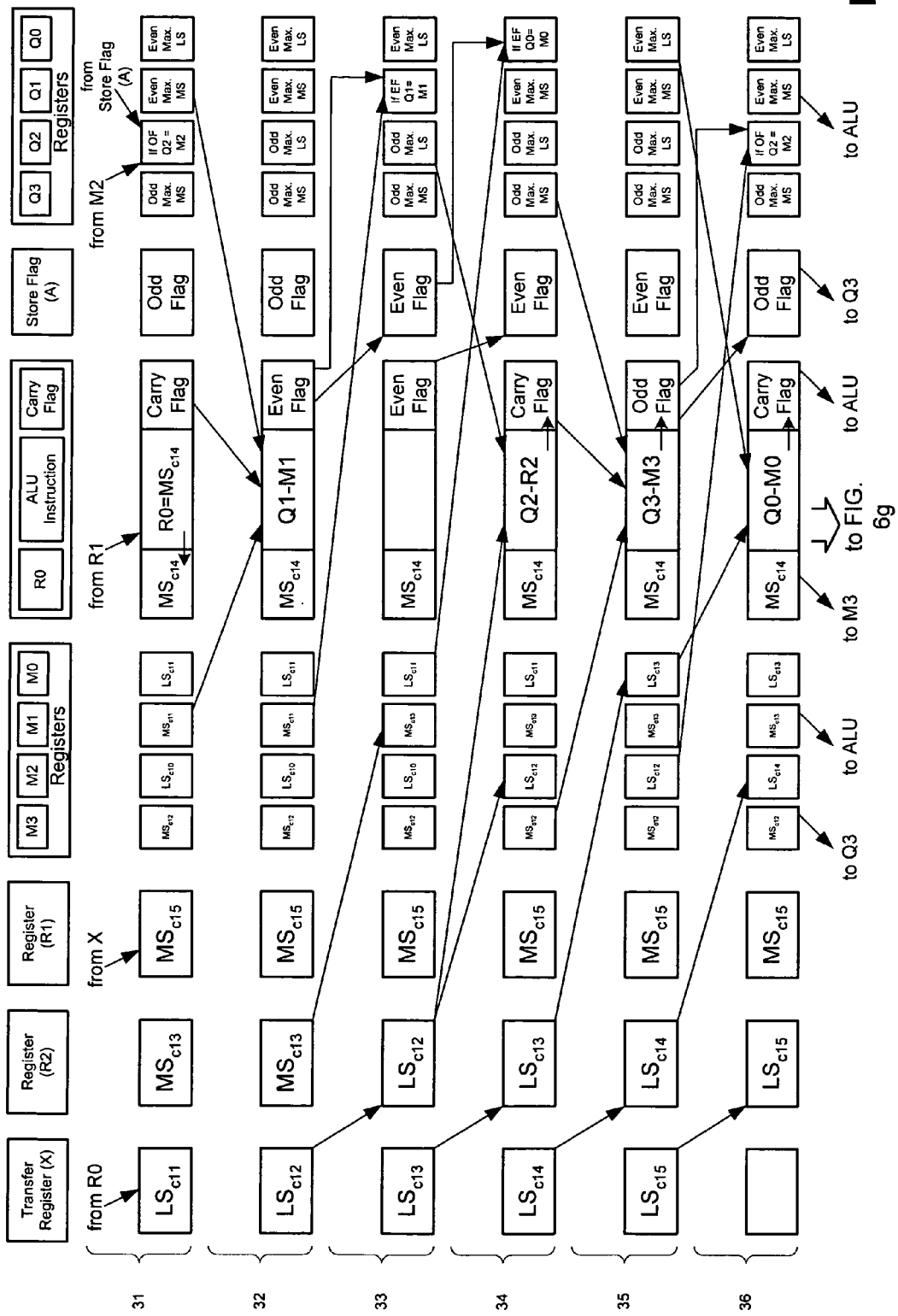
Figure 6G:
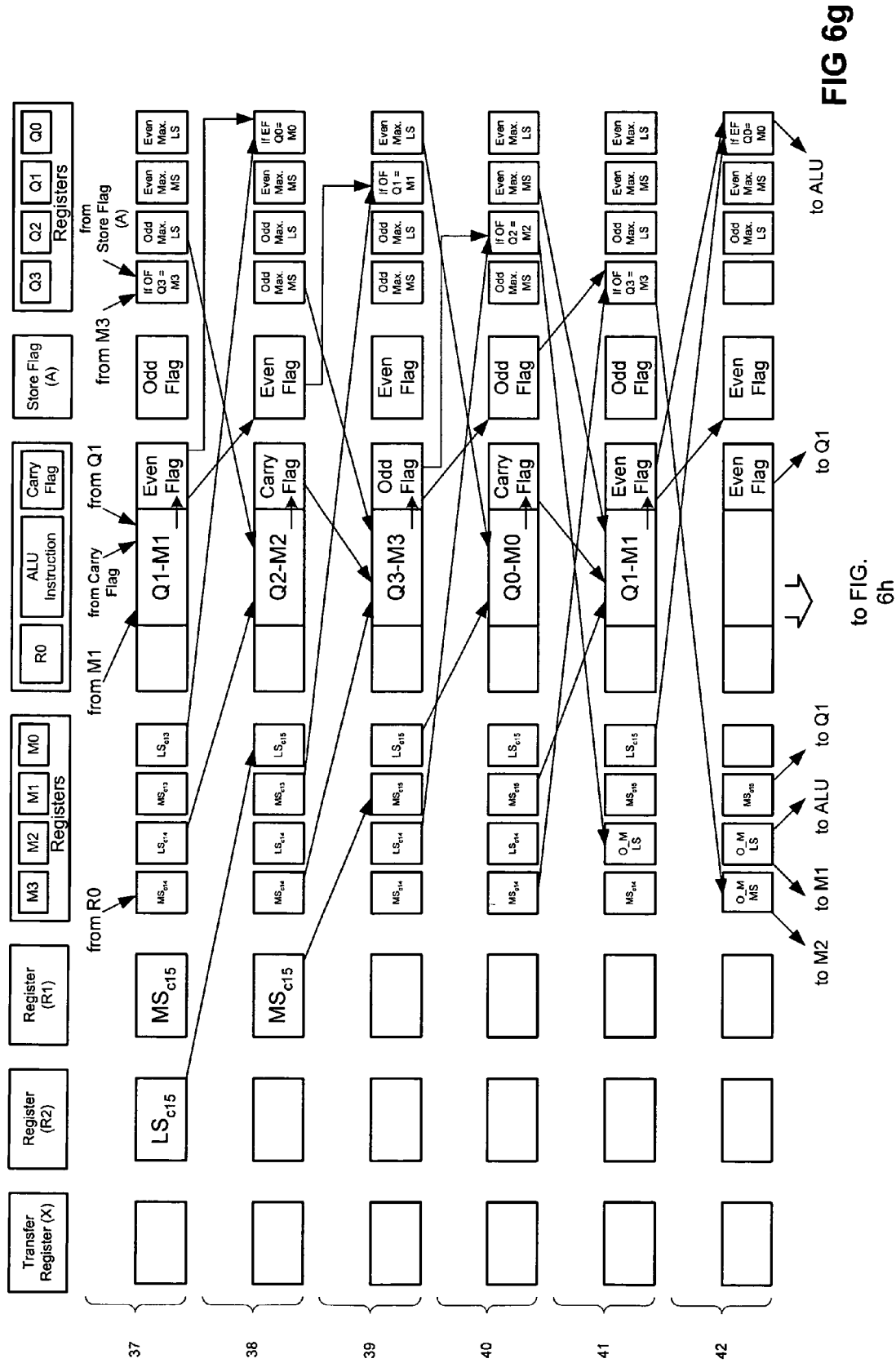
Figure 6H:
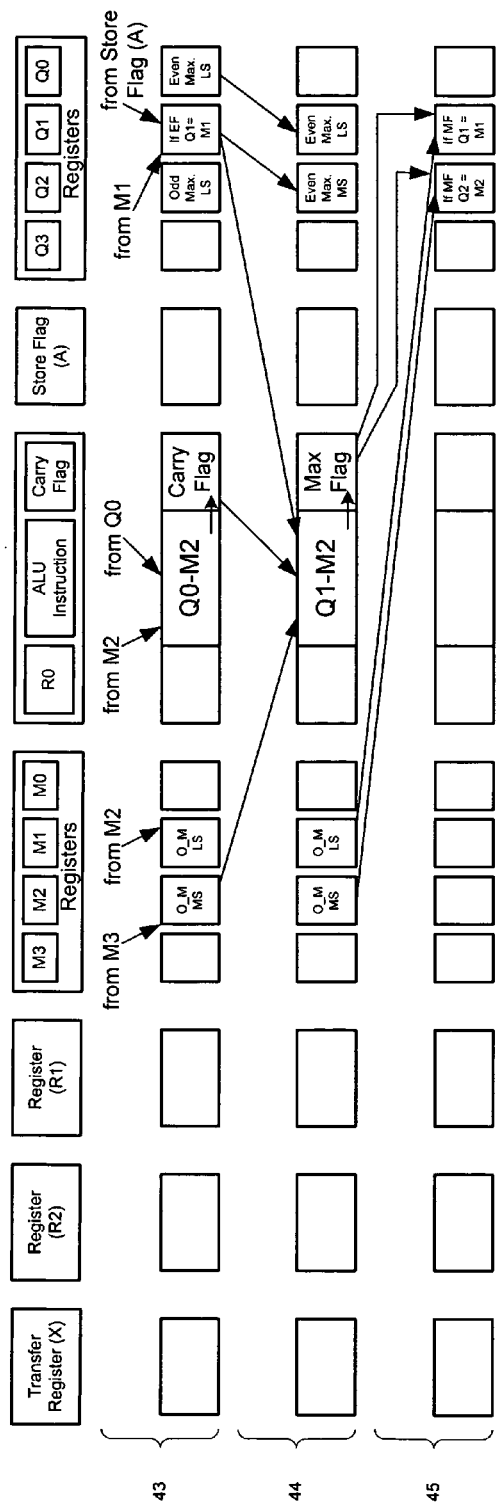

Referring to FIGS. 6b and 6c the first burst of MS bytes are transferred from the X-register during clock pulse number nine (9) through clock pulse number sixteen (16). Likewise referring to FIGS. 6c through 6f, bursts of LS bytes are transferred from the X-register during clock pulse number eighteen (18) through clock pulse number twenty-three (23) and during clock pulse number thirty-three (33) through clock pulse number thirty-six (36), whereas bursts of MS bytes are transferred during clock pulse number twenty-five (25) through clock pulse number thirty-one (31).

Referring to FIG. 6a-6h, it can be seen that the remaining shorts are loaded and moved throughout the odd and even pipelines. It can also be seen that the odd numbered shorts are compared to the odd extrema that is conditionally saved in registers Q3 and Q2. For example, the LS-byte of short-5 (i.e., $LS_{c4}$) and the MS-byte of short-5 (i.e., $MS_{c4}$) are compared to the LS-byte odd extrema and to the MS-byte odd extrema, respectively during clock pulses numbered fourteen and fifteen and the LS-byte of short-7 (i.e., $LS_{c6}$) and the MS-byte of short-7 (i.e., $MS_{c6}$) are compared to the LS-byte odd extrema and to the MS-byte odd extrema, respectively, during clock pulses numbered nineteen and twenty.

Likewise, it can be seen that the remaining even numbered shorts are compared to the even extrema that is conditionally saved in registers Q1 and Q0. For example, the LS-byte of short-6 (i.e., $LS_{c5}$) and the MS-byte of short-6 (i.e., $MS_{c5}$) are compared to the LS-byte even extrema and to the MS-byte even extrema, respectively during clock pulses numbered sixteen and seventeen and the LS-byte of short-8 (i.e., $LS_{c7}$) and the MS-byte of short-8 (i.e., $MS_{c7}$) are compared to the LS-byte odd extrema and to the MS-byte odd extrema, respectively, during clock pulses numbered twenty-one and twenty-two.

Referring now to clock pulse number forty-one (41), it can be seen that after the last odd numbered LS-byte has been compared to the LS-byte of the odd extrema, the LS-byte of the odd extrema is loaded into the second register from the fourth register (among others). In the current embodiment, the LS-byte of the odd extrema is loaded from register Q2 to register M2, among others.

Likewise during clock pulse number forty-two (42), it can be seen that after the last odd numbered MS-byte has been compared to the MS-byte of the odd extrema, the MS-byte of the odd extrema is loaded into the seventh register from the ninth register (among others). In the current embodiment, the MS-byte of the odd extrema is loaded from register Q3 to register M3, among others.

During clock pulses number forty-three (43), the LS-byte of the odd extrema is compared to the LS-byte of the even extrema, whereas in operation forty-four (44), the MS-byte of the odd extrema is compared to the MS-byte of the even extrema. As previously discussed, the value assigned to the carry flag during clock pulses forty three (43) and forty-four (44) is dependent upon the results of the comparison.

During clock pulse number forty-five (45), the contents of the second and eighth registers are conditionally saved to the fourth and tenth registers, respectively. For example, in the current embodiment if the odd extrema is greater than the even extrema, the contents of registers M2 and M1 are loaded into registers Q2 and Q1, respectively. On the contrary, if the even extrema is greater than or equal to the odd extrema, the MS-byte and the LS-byte of the even extrema remain in registers Q2 and Q1, respectively. In either instance, the values within registers Q2 and Q1 after clock pulse number forty-five (45) represent the MS-byte and the LS-byte, respectively, of the dimensional extrema for row-c.

It should be recognized that the above-described embodiments of the invention are intended to be illustrative only. Numerous alternative embodiments may be devised by those skilled in the art without departing from the scope of the following claims.

What is claimed is:

1. A method of operating an n-dimensional array of processing elements to determine a dimensional extrema for a plurality of values stored in said n-dimensional array of processing elements, the method comprising:
    determining within each of said processing elements a local extrema for each of said processing elements, said local extrema having a most significant byte and a least significant byte;
    serially outputting in bursts said most significant bytes and said least significant bytes of said local extrema from each of said processing elements to a neighboring processing element until every processing element in a first dimension has received all local extrema along said first dimension, wherein a burst length is selected to optimize use of each processing element's ALU;
    determining within each of said processing elements a first dimensional extrema for said first dimension of said n-dimensional array, wherein said first dimensional extrema is determined from a plurality of local extrema most significant bytes and least significant bytes stored in said processing elements in said first dimension and wherein said first dimensional extrema has a most significant byte and a least significant byte; and
    saving in a register said dimensional extrema.

2. The method of claim 1 wherein said determining within each of said processing elements a first dimensional extrema for a first dimension of said n-dimensional array comprises:
    receiving a set of local extrema from said processing elements within said first dimension;
    separating said set of local extrema into an odd set corresponding to values in odd positions within said set of received local extremas and an even set corresponding to values in even positions within said set of received local extremas;
    separating each of said odd local extrema into at least one of an odd most significant byte and an odd least significant byte;
    separating each of said even local extrema into at least one of an even most significant byte and an even least significant byte;
    determining an odd extrema from said odd set of least significant bytes and most significant bytes;
    determining an even extrema from said even set of least significant bytes and most significant bytes; and
    determining said first dimensional extrema for a first dimension from said odd extrema and said even extrema.

3. The method of claim 2 wherein said receiving a set of local extrema from said processing elements within said first dimension comprises:
    receiving a burst of said odd and even least significant bytes; and
    receiving a burst of said odd and even most significant bytes.

4. The method of claim 3 further comprising:
    selecting a burst length for said burst of odd and even least significant bytes and a burst length for said odd and even most significant bytes to minimize the amount of lost cycles within said processing elements.

5. The method of claim 2 wherein determining an odd extrema from said odd set comprises:
    loading the least significant byte of an odd local extrema into a least significant odd byte register;
    loading the most significant byte of said odd local extrema into a most significant odd byte register;
    comparing the contents of said least significant odd byte register to the least significant byte of another odd local extrema and setting a carry flag relative to said comparison;
    comparing the contents of said most significant odd byte register to the most significant byte of said another odd local extrema and setting an odd flag relative to said comparison; and
    conditionally updating said most significant odd byte register and said least significant odd byte register relative to said odd flag.

6. The method of claim 5 further comprising repeating said comparing the contents of said most significant odd byte register, said comparing the contents of said least significant odd byte register, and said conditionally updating said most significant odd byte register and said least significant odd byte register for each of said odd local extrema within said set.

7. The method of claim 2 wherein said determining an even extrema from said even set comprises.
    loading the least significant byte of an even local extrema into a least significant even byte register;
    loading the most significant byte of said even local extrema into a most significant even byte register;
    comparing the contents of said least significant even byte register to the least significant byte of another even local extrema and setting a carry flag relative to said comparison;
    comparing the contents of said most significant even byte register to the most significant byte of said another even local extrema and setting an even flag relative to said comparison; and
    conditionally updating said most significant even byte register and said least significant even byte register relative to said even flag.

8. The method of claim 7 further comprising repeating said comparing the contents of said most significant even byte register, said comparing the contents of said least significant even byte register, and said conditionally updating said most significant even byte register and said least significant even byte register for each of said even local extrema within said set.

9. The method of claim 2 wherein said determining said first dimensional extrema from said odd extrema and said even extrema further comprises:
    loading the least significant byte of said odd extrema into a least significant odd byte register and the most significant byte of said odd extrema into a most significant odd byte register;
    loading the least significant byte of said even extrema into a least significant even byte register and the most significant byte of said even extrema into a most significant even byte register;

comparing the contents of said least significant even byte register to the contents of said least significant odd byte register and setting a carry flag relative to a result of said comparison;

comparing the contents of said most significant even byte register to the contents of said most significant odd byte register and setting an extrema flag relative to a result of said comparison; and conditionally updating said most significant even byte register and said least significant even byte register relative to said extrema flag.

10. The method of claim 1 additionally comprising determining within each of said processing elements a next dimensional extrema for a next dimension of said n-dimensional array, said determining a next dimensional extrema comprising:

receiving a set of said first dimensional extrema from said processing elements within said next dimension;

separating said set of first dimensional extrema into an odd set corresponding to values in odd positions within said set of received first dimensional extrema and an even set corresponding to values in even positions within said set of received first dimensional extrema;

separating each of said odd first dimensional extrema into at least one of an odd most significant byte and an odd least significant byte;

separating each of said even first dimensional extrema into at least one of an even most significant byte and an even least significant byte;

determining an odd extrema from said odd set;

determining an even extrema from said even set; and determining said next dimensional extrema for a next dimension from said odd extrema and said even extrema.

11. The method of claim 10 wherein said receiving a set of said first dimensional extrema from said processing elements within said next dimension comprises:

receiving a burst of said odd and even least significant bytes; and receiving a burst of said odd and even most significant bytes.

12. The method of claim 11 further comprising:

selecting a burst length for said burst of odd and even least significant bytes and a burst length for said odd and even most significant bytes to minimize the amount of lost cycles within said processing elements.

13. The method of claim 1 additionally comprising repeating said determining within each of said processing elements a next dimensional extrema for each of n-said dimensions, said repeating said determining comprising:

receiving a set of dimensional extrema from a previously selected dimension from said processing elements within a currently selected dimension;

separating said set of dimensional extrema from said previously selected dimension into an odd set corresponding to values in odd positions within said set of received next dimensional extrema and an even set corresponding to values in even positions within said set of received next dimensional extrema;

separating each of said odd next dimensional extrema into at least one of an odd most significant byte and an odd least significant byte;

separating each of said even next dimensional extrema into at least one of an even most significant byte and an even least significant byte;

determining a odd extrema from said odd set;

determining an even extrema from said even set; and determining said next dimensional extrema for said next dimension from said odd extrema and said even extrema.

14. An n-dimensional array of processing elements, comprising:

a plurality of processing elements interconnected to form an n-dimensional array, each processing element comprising:

an arithmetic logic unit;

condition logic responsive to said arithmetic logic unit;

a plurality of registers connected to a bus and responsive to said arithmetic logic unit;

a result pipeline responsive to said arithmetic logic unit;

an interface; and register files connected between said interface and said result pipeline; said processing elements configured to:

determine a local extrema for each of said processing elements, said local extrema having a most significant byte and a least significant byte;

serially output in bursts said most significant bytes and said least significant bytes of said local extrema from each of said processing elements to a neighboring processing element until every processing element in a first dimension has received all local extrema along said first dimension, where a burst length is selected to optimize use of each processing elements arithmetic logic unit;

determine within each of said processing elements a first dimensional extrema for said first dimension of said n-dimensional array, wherein said first dimensional extrema is determined from a plurality of local extrema most significant bytes and least significant bytes stored in said processing elements in said first dimension and wherein said first dimensional extrema has a most significant byte and a least significant byte; and saving said dimensional extrema.

15. The array of processing elements of claim 14 wherein said processing elements are configured to:

receive a set of local extrema from said processing elements within said first dimension;

separate said set of local extrema into an odd set corresponding to values in odd positions within said set of received local extremas and an even set corresponding to values in even positions within said set of received local extremas;

separate ach of said odd local extrema into at least one of an odd most significant byte and an odd least significant byte;

separate each of said even local extrema into at least one of an even most significant byte and an even least significant byte;

determine an odd extrema from said odd set of least significant bytes and most significant bytes;

determine an even extrema from said even set of least significant bytes and most significant bytes; and determine said first dimensional extrema for a first dimension from said odd extrema and said even extrema.

16. The array of processing elements of claim 15 wherein said processing elements are configured to:

receive a burst of said odd and even least significant bytes; and receive a burst of said odd and even most significant bytes, and wherein a burst length for said burst of odd and even least significant bytes and a burst length for said odd and even most significant bytes is selected to minimize the amount of lost cycles within said processing elements.

17. The array of processing elements of claim 15 wherein said processing elements are configured to:
- load the least significant byte of an odd local extrema into a least significant odd byte register;
- load the most significant byte of said odd local extrema into a most significant odd byte register;
- compare the contents of said least significant odd byte register to the least significant byte of another odd local extrema and setting a carry flag relative to said comparison;
- compare the contents of said most significant odd byte register to the most significant byte of said another odd local extrema and setting an odd flag relative to said comparison; and
- conditionally update said most significant odd byte register and said least significant odd byte register relative to said odd flag.

18. The array of processing elements of claim 17 wherein said processing elements are configured to:
- repeat said comparing the contents of said most significant odd byte register, said comparing the contents of said least significant odd byte register, and said conditionally updating said most significant odd byte register and said least significant odd byte register for each of said odd local extrema within said set.

19. The array of processing elements of claim 15 wherein said processing elements are configured to:
- load the least significant byte of an even local extrema into a least significant even byte register;
- load the most significant byte of said even local extrema into a most significant even byte register;
- compare the contents of said least significant even byte register to the least significant byte of another even local extrema and setting a carry flag relative to said comparison;
- compare the contents of said most significant even byte register to the most significant byte of said another even local extrema and setting an even flag relative to said comparison; and
- conditionally update said most significant even byte register and said least significant even byte register relative to said even flag.

20. The array of processing elements of claim 19 wherein said processing elements are configured to:
- repeat said comparing the contents of said most significant even byte register, said comparing the contents of said least significant even byte register, and said conditionally updating said most significant even byte register and said least significant even byte register for each of said even local extrema within said set.

21. The array of processing elements of claim 15 wherein said processing elements are configured to:
- load the least significant byte of said odd extrema into a least significant odd byte register and the most significant byte of said odd extrema into a most significant odd byte register;
- load the least significant byte of said even extrema into a least significant even byte register and the most significant byte of said even extrema into a most significant even byte register;
- compare the contents of said least significant even byte register to the contents of said least significant odd byte register and setting a carry flag relative to a result of said comparison;
- compare the contents of said most significant even byte register to the contents of said most significant odd byte register and setting an extrema flag relative to a result of said comparison; and
- conditionally update said most significant even byte register and said least significant even byte register relative to said extrema flag.

22. The array of processing elements of claim 14 wherein said processing elements are additionally configured to:
- receive a set of said first dimensional extrema from said processing elements within a next dimension;
- separate said set of first dimensional extrema into an odd set corresponding to values in odd positions within said set of received and an even set corresponding to values in even positions within said set of received;
- separate each of said odd first dimensional extrema into at least one of an odd most significant byte and an odd least significant byte;
- separate each of said even first dimensional extrema into at least one of an even most significant byte and an even least significant byte;
- determine an odd extrema from said odd set;
- determine an even extrema from said even set; and
- determine said next dimensional extrema for a next dimension from said odd extrema and said even extrema.

23. The array of processing elements of claim 22 wherein said processing elements are configured to:
- receive a burst of said odd and even least significant bytes; and
- receive a burst of said odd and even most significant bytes, and wherein a burst length for said burst of odd and even least significant bytes and a burst length for said odd and even most significant bytes is selected to minimize the amount of lost cycles within said processing elements.

24. The array of processing elements of claim 14 wherein said processing elements are additionally configured to:
- receive a set of next dimensional extrema from a previously selected dimension from said processing elements within a currently selected dimension;
- separate said set of dimensional extrema from said previously selected dimension into an odd set corresponding to values in odd positions within said set of received next dimensional extrema and an even set corresponding to values in even positions within said set of received next dimensional extrema;
- separate each of said odd next dimensional extrema into at least one of an odd most significant byte and an odd least significant byte;
- separate each of said even next dimensional extrema into at least one of an even most significant byte and an even least significant byte;
- determine a odd extrema from said odd set;
- determine an even extrema from said even set; and
- determine said next dimensional extrema for said next dimension from said odd extrema and said even extrema.

* * * * *

UNITED STATES PATENT AND TRADEMARK OFFICE
CERTIFICATE OF CORRECTION

PATENT NO. : 7,574,466 B2  Page 1 of 1
APPLICATION NO. : 10/689449
DATED : August 11, 2009
INVENTOR(S) : Mark Beaumont It is certified that error appears in the above-identified patent and that said Letters Patent is hereby corrected as shown below:

In column 19, line 39, in Claim 1, delete "in-said" and insert -- in said --, therefor.

In column 20, line 34, in Claim 7, delete "comprises." and insert -- comprises: --, therefor.

In column 21, line 49, in Claim 13, delete "n-said dimensions," and insert -- said n-dimensions, --, therefor.

In column 22, line 47, in Claim 15, delete "ach" and insert -- each --, therefor.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,574,466 B2 Page 1 of 1
APPLICATION NO. : 10/689449
DATED : August 11, 2009
INVENTOR(S) : Mark Beaumont It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 988 days.

Signed and Sealed this

Seventh Day of September, 2010

David J. Kappos
*Director of the United States Patent and Trademark Office*